US006826156B1

United States Patent
Sutton et al.

(10) Patent No.: US 6,826,156 B1
(45) Date of Patent: Nov. 30, 2004

(54) LOOPBACK PROCESSING METHOD AND APPARATUS

(75) Inventors: Todd Sutton, San Diego, CA (US); Houtan Dehesh, Encinitas, CA (US); Jan K. Wegrzyn, San Diego, CA (US); Roy G. Moss, San Diego, CA (US); Juan Faus, San Diego, CA (US); David T. Clapp, Borrego Springs, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/151,533

(22) Filed: Sep. 11, 1998

Related U.S. Application Data

(63) Continuation-in-part of application No. 09/104,050, filed on Jun. 24, 1998.

(51) Int. Cl.⁷ .......................... G01R 31/08; G06F 11/00; G08C 15/00
(52) U.S. Cl. ..................... 370/249; 370/248; 370/328; 375/221; 714/216
(58) Field of Search ................................ 370/241, 248, 370/249, 328; 455/67.1, 67.4, 115; 375/213, 220, 221, 224, 226, 227, 228; 714/712, 715, 716

(56) References Cited

U.S. PATENT DOCUMENTS

| | | | | |
|---|---|---|---|---|
| 4,180,708 A | * | 12/1979 | Yamaguchi et al. ............ | 379/2 |
| 4,829,554 A | * | 5/1989 | Barnes et al. ................ | 455/422 |
| 4,860,281 A | | 8/1989 | Finley et al. ................. | 370/15 |
| 5,199,025 A | * | 3/1993 | Miwa ......................... | 370/224 |
| 5,245,634 A | * | 9/1993 | Averbuch .................... | 370/324 |
| 5,265,089 A | * | 11/1993 | Yonehara .................... | 370/249 |
| 5,659,540 A | * | 8/1997 | Chen et al. .................. | 370/249 |
| 5,768,689 A | * | 6/1998 | Borg .......................... | 455/561 |
| 5,854,816 A | * | 12/1998 | Kim et al. ................... | 370/249 |
| 5,864,555 A | * | 1/1999 | Mathur et al. ............ | 370/236.2 |
| 6,023,455 A | * | 2/2000 | Takahashi .................... | 370/249 |

FOREIGN PATENT DOCUMENTS

| | | |
|---|---|---|
| DE | 4215422 | 5/1991 |
| EP | 0380730 | 8/1990 |
| JP | 57068955 | 4/1982 |

* cited by examiner

*Primary Examiner*—Bob A. Phunkulh
(74) *Attorney, Agent, or Firm*—Russell B. Miller; Christopher Edwards

(57) ABSTRACT

A loopback processing method includes detecting a loopback at a first entity in a wide area network. The detection is accomplished by recognizing that a "memorized" frame has returned on the same communications interface within a given period of time. The time interval between sending the frame and detecting it returning at the same port may be recorded and sent to an operator to provide information on the relative location of the loopback in the network. A loopback detect sequence is sent from the first entity to a second entity on the communications interface in loopback. Because of the loopback, both entities receive the loopback detect sequence. Either or both entities may inform a network operator of the loopback. The first entity has stopped using the link in loopback for real data, instead sending the loopback detect sequence. The second entity, upon detecting the loopback detect sequence, also stops using the link for real data. When the first entity stops detecting the loopback detect sequence returning on the link, the first entity stops sending the loopback detect sequence and begins using the link for real data again. When the second entity stops receiving the loopback detect sequence on the link, the second entity begins using the link for real data again. Either or both entities may inform a network operator that the loopback is gone.

32 Claims, 15 Drawing Sheets

LOOPBACK PROCESSING METHOD AND APPARATUS

CROSS-REFERENCE TO RELATED APPLICATION

This application is a continuation-in-part of copending U.S. application Ser. No. 09/104,050, filed Jun. 24, 1998.

BACKGROUND OF THE INVENTION

I. Field of the Invention

The present invention pertains generally to the field of wireless communications, and more specifically to detecting, isolating, tolerating, and recovering from loopbacks in wide area networks equipped to process packetized data.

II. Background

The field of wireless communications has many applications including, e.g., cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008, etc. (often referred to collectively herein as IS-95), are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459, which is assigned to the assignee of the present invention and fully incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MULTICHANNEL DEMODULATOR, which is assigned to the assignee of the present invention and fully incorporated herein by reference.

In CDMA systems, over-the-air power control is a vital issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same RF band. For example, each mobile subscriber unit (typically a cellular telephone) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum. It is to be understood that while 1.25 MHz is a preferred CDMA channel bandwidth, the CDMA channel bandwidth need not be restricted to 1.25 MHz, and could be any number, such as, e.g., 5 MHz.

Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit from the coverage area of two or more base stations that involves simultaneously interfacing with two base stations. (In contrast, hard handoff involves terminating the interface with a first base station before establishing the interface with a second base station.) An exemplary method of performing soft handoff is described in U.S. Pat. No. 5,267,261, which is assigned to the assignee of the present invention and fully incorporated herein by reference.

In conventional cellular telephone systems, a public switched telephone network (PSTN) (typically a telephone company) and a mobile switching center (MSC) communicate with one or more base station controllers (BSCs) over standardized E1 and/or T1 telephone lines (hereinafter referred to as E1/T1 lines). The BSCs communicate with base station transceiver subsystems (BTSs) (also referred to as either base stations or cell sites), and with each other, over a backhaul comprising E1/T1 lines. The BTSs communicate with mobile units (i.e., cellular telephones) via RF signals sent over the air.

In conventional systems, when information is exchanged over the backhaul between a BSC and any of multiple BTSs, or between two BSCs, at a data rate higher than the rate provided by a single E1/T1 link, bit-level inverse multiplexers (IMUXes) are used. One bit at a time, the IMUX segments, or demultiplexes, a high-speed bit stream into fixed quantities and places them onto different E1 or T1 lines. A receiver in the BSC or BTS multiplexes the incoming bit streams and reassembles them into a single high-speed bit stream. The IMUX preserves the bit stream regardless of differential delays from different backhaul connections by adding a segment identifier, which consumes valuable bandwidth. Moreover, the design of bit-level IMUXes typically varies from one manufacturer to another, making it difficult to take advantage of standardized telephone-company interfaces. This is especially significant if different suppliers are used for the BSC and the backhaul interface unit of the BTS. Moreover, for any given E1/T1 link, the bit-level IMUX represents a single point of failure, at least temporarily, for the logical connection between the two communicating entities. It would be advantageous, therefore, to provide a reliable, low-cost method of inverse multiplexing that can be applied to standardized interfaces.

Conventional cellular telephone systems are typically configured for point-to-point transmission of packetized data, such as, e.g., between a BSC and a BTS. One of the main problems that arise when a wide area network is used for point-to-point packet data transmission is the random generation of loopbacks, which prevent point-to-point data communications. Locating the loopback poses a significant problem because of the large size of wide area networks. The term "loopbacks" refers to a condition in which data sent along an E1/T1 line is returned to the sending entity. In one form of loopback, the data might also be transmitted to the receiving entity. In another form, the data is returned to the sending unit without also being transmitted. Loopbacks arise for various reasons including, e.g., physical defects, system testing, and technician error.

In conventional systems loopbacks are detected only after the loss of a significant amount of data. Upon detection, manual intervention is required to locate and eliminate the loopback. A field technician must make various telephone calls and drive out to the site of the loopback. The technician must then manually repair the loopback condition. It stands to reason that detecting and recovering from loopbacks can result in dropped telephone calls and is both labor-intensive, and time-consuming. Thus, there is a need for a built-in method of detecting, isolating, tolerating, and recovering from loopbacks.

SUMMARY OF THE INVENTION

The present invention is directed to a built-in method of detecting, isolating, tolerating, and recovering from loopbacks. Accordingly, in one aspect of the invention, a loopback processing method advantageously includes the steps of detecting a loopback in a communications interface between two entities, sending a loopback detect sequence on the communications interface, and stopping sending if the loopback detect sequence does not return to the first entity. In another aspect of the invention, a device for processing loopbacks advantageously includes circuitry for detecting a loopback in a communications interface, sending a loopback detect sequence on the communications interface, and stopping sending if the loopback detect sequence does not return on the communications interface.

DETAILED DESCRIPTION OF THE PREFERRED EMBODIMENTS

Various cellular systems for wireless telephone communication employ fixed base stations that communicate with mobile units via an over-the-air interface. Such cellular systems include, e.g., AMPS (analog), IS-54 (North American TDMA), GSM (Global System for Mobile communications TDMA), and IS-95 (CDMA). In a preferred embodiment, the cellular system is a CDMA system.

Figure 1:
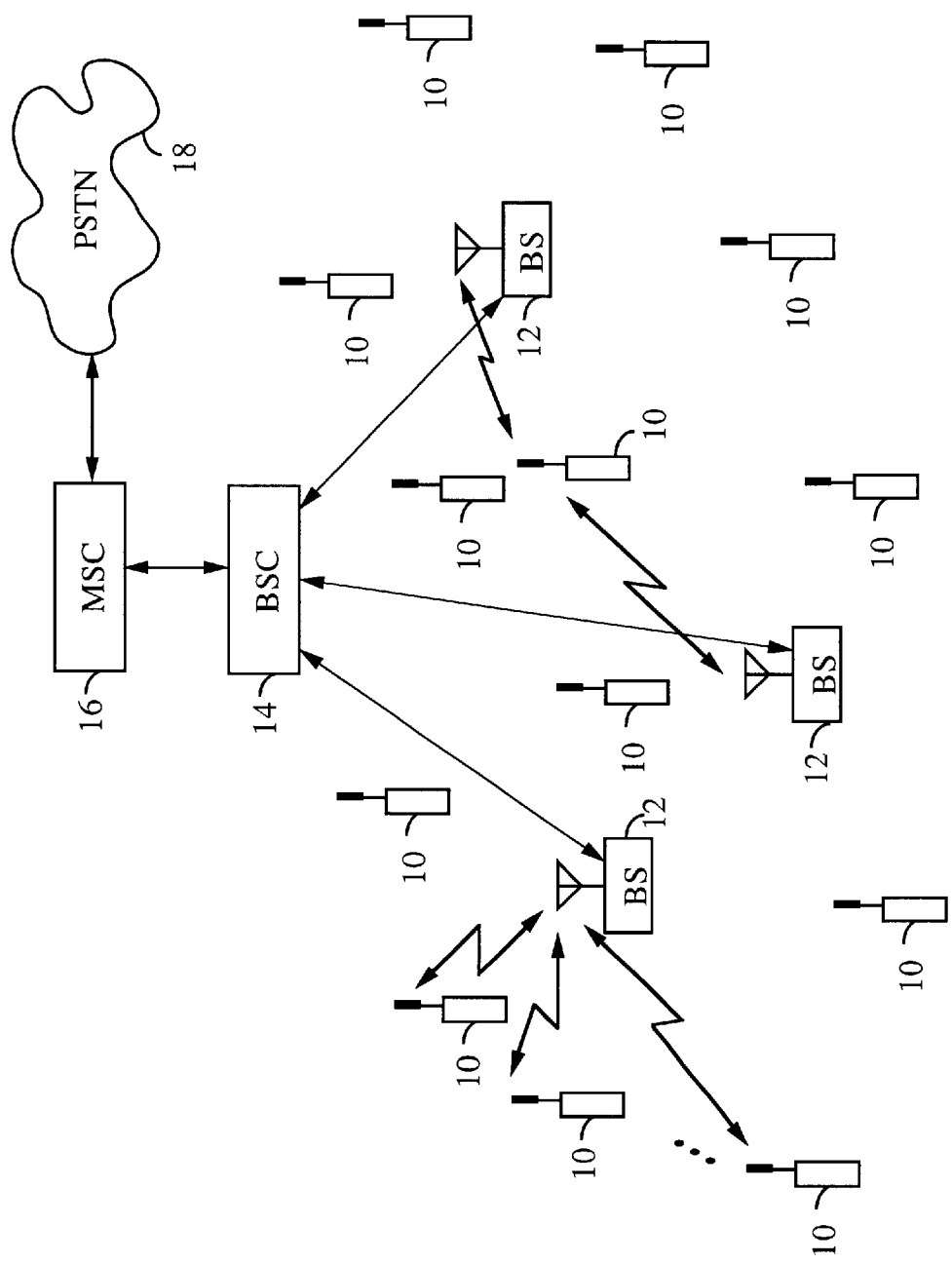
FIG. 1 is a block diagram of a cellular telephone system.

As illustrated in FIG. 1, a CDMA wireless telephone system generally includes a plurality of mobile subscriber units 10, a plurality of base stations 12, a base station controller (BSC) 14, and a mobile switching center (MSC) 16. The MSC 16 is configured to interface with a conventional public switch telephone network (PSTN) 18. The MSC 16 is also configured to interface with the BSC 14. The BSC 14 is coupled to each base station 12 via backhaul lines. In various embodiments the backhaul lines may be configured for voice and/or data transmission in accordance with any of several known interfaces including, e.g., E1 telephone lines, T1 telephone lines, Asynchronous Transfer Mode (ATM), Internet Protocol (IP), Point-to-Point Protocol (PPP), Frame Relay, HDSL, ADSL, or xDSL. It is to be understood that there can be more than one BSC 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments, with each frequency assignment advantageously comprising 1.25 MHz of spectrum. Alternatively, each frequency assignment may comprise an amount of spectrum other than 1.25 MHz, such as, e.g., 5 MHz. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. (Alternatively, individual sectors of a given BTS 12 may be referred to as cell sites.) The mobile subscriber units 10 are typically cellular telephones 10, and the cellular telephone system is advantageously a CDMA system configured for use in accordance with the IS-95 standard. During typical operation of the cellular telephone system, the base stations 12 receive sets of reverse-link signals from sets of mobile units 10. The mobile units 10 are conducting telephone calls or other communications. Each reverse-link signal received by a given base station 12 is processed within that base station 12. The resulting data is forwarded to the BSC 14. The BSC 14 provides call resource allocation and mobility management functionality including the orchestration of soft handoffs between base stations 12. The BSC 14 also routes the received data to the MSC 16, which provides additional routing services for interface with the PSTN 18. Similarly, the PSTN 18 interfaces with the MSC 16, and the MSC 16 interfaces with the BSC 14, which in turn controls the base stations 12 to transmit sets of forward-link signals to sets of mobile units 10.

Figure 2:
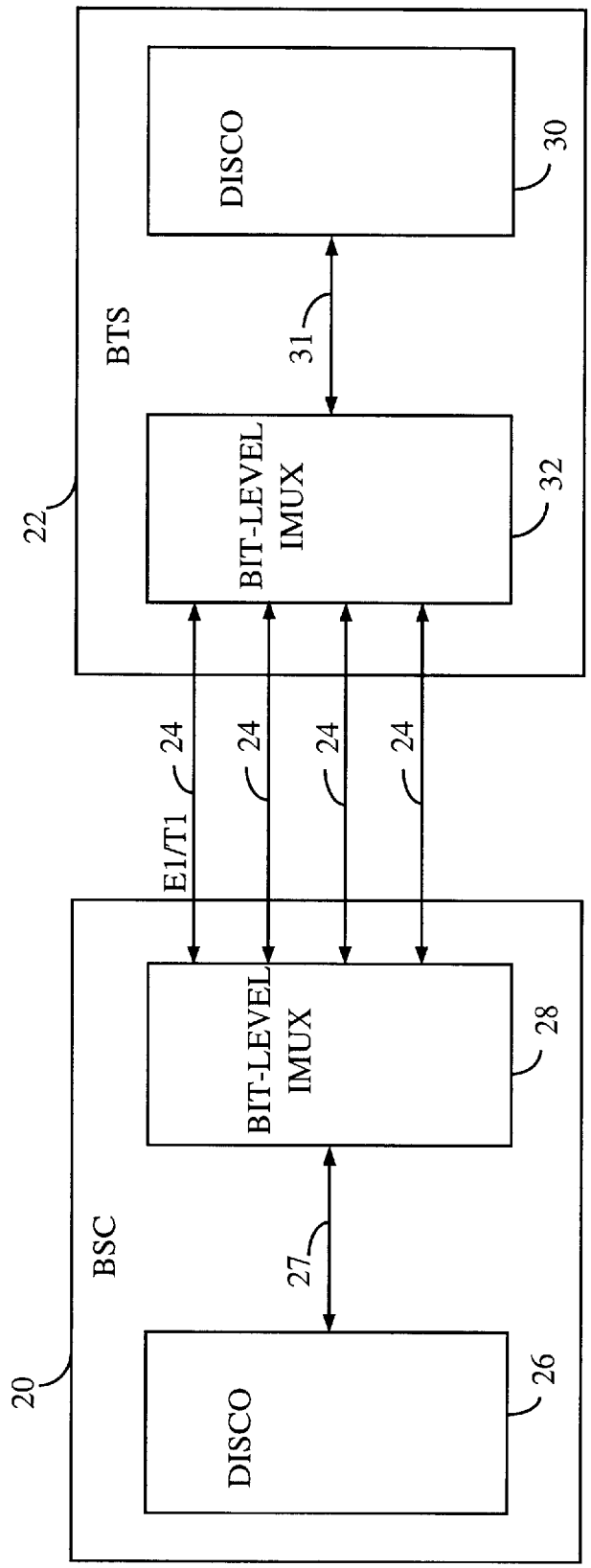
FIG. 2 is a block diagram of a conventional backhaul connection between a BSC and a BTS.

The BSC 20 may be coupled to a given BTS 22 through a backhaul connection comprising multiple E1/T1 lines 24, as shown in FIG. 2. The BSC 20 conventionally includes a distribution and consolidation unit (DISCO) 26 coupled to a bit-level inverse multiplexer (IMUX) 28. The BTS 22 likewise conventionally includes a DISCO 30 coupled to a bit-level IMUX 32. The respective IMUXes 28, 32 are coupled to opposing ends of the E1/T1 lines 24. Consolidation is the process of combining several lower rate physical interfaces into a single higher rate physical interface. For example, E1/T1 lines 24 are consolidated into connection 27, or connection 31. Or E1/T1 lines 24 multiplexed into connections 27 or 31 are consolidated into a consolidation bus (not shown) within DISCO 26 or 30. Distribution is the process of filtering a higher rate physical interface into a set of lower rate interfaces based on a given criteria (i.e., destination address). For example, a distribution bus (not shown) within DISCO 26 or 30 is distributed into connections 27 or 31. Or connections 27 or 31 are distributed into E1/T1 lines 24. When data travels from the BSC 20 to the BTS 22, the IMUX 28 parses a high-speed bit stream into fixed segments. The segments are placed onto different E1/T1 lines 24. The IMUX 32 receives and multiplexes the incoming bit streams, bit by bit, removing the overhead bits and reassembling the segments into one high-speed bit stream. Data flow from the BTS 22 to the BSC 20 is handled in similar fashion. The packets, or frames, may be configured according to a communications protocol known as HDLC (High-level Data Link Control). Alternatively, any other frame protocol may be used.

Figure 3:
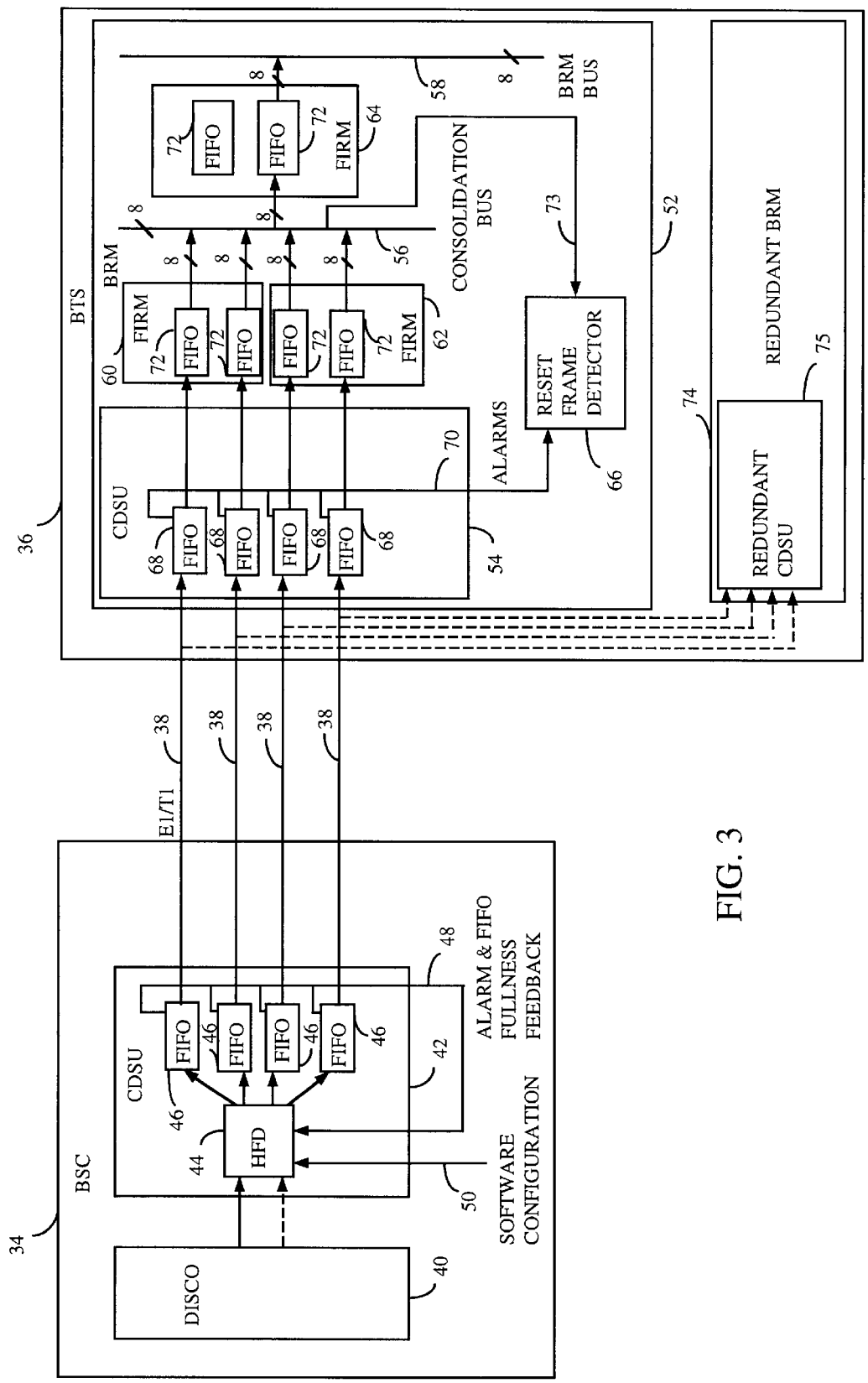
FIG. 3 is a block diagram of a one-way backhaul connection between a BSC and a first type of BTS.

In one embodiment, shown in FIG. 3, an HDLC frame distribution (HFD) algorithm effects frame-level IMUXing in a BSC 34, thereby eliminating the need for bit-level IMUXes. In the embodiment of FIG. 3, the BSC 34 is coupled to a BTS 36 via a backhaul connection comprising four E1/T1 lines 38. While only one backhaul connection and one BTS 36 are shown for simplicity, those of skill in the art would understand that the number of connections and BTSs 36 is not restricted to one. Similarly, it would be understood that the number of E1/T1 lines 38 need not be limited to four.

Within the BSC 34, a DISCO 40 is coupled to a channel and data service unit (CDSU) 42. Redundant, or standby, coupling (depicted as a dotted-line arrow) is advantageously available. Within the CDSU 42, HFD logic 44 is coupled to four buffers 46, which are advantageously FIFOs 46, there being one FIFO 46 coupled to each respective E1/T1 line 38. A feedback tap 48 is taken from framing units (not shown) associated with each FIFO 46 and is coupled to the HFD logic 44, providing information on fullness of the respective FIFOs 46 and alarm status of the respective E1/T1 lines 38 to the HFD logic 44. The HFD logic 44 also includes an input 50 for software configuration. Although advantageously implemented with hardware such as, e.g., registers, the HFD logic 44 may alternatively be implemented with software.

Within the BTS 36, a base station router module (BRM) 52 includes a CDSU 54, a consolidation bus 56, a BRM bus 58 three frame interface and router modules (FIRMs) 60, 62, 64, and a reset frame detector 66. The CDSU 54 contains four buffers 68, which are advantageously FIFOs 68, there being one FIFO 68 coupled to each respective E1/T1 line 38. A tap 70 is taken from framing units (not shown) associated with each FIFO 68 and is coupled to the reset frame detector 66, providing information on alarms to the reset frame detector 66. The FIRMs 60, 62, 64 are advantageously conventional filter/buffer entities known to those of skill in the art and available off the shelf. Each FIRM 60, 62, 64 advantageously includes two FIFOs 72. Each FIFO 68 is coupled to a respective FIFO 72 in FIRMs 60, 62. Each FIFO 72 in FIRMs 60, 62 is coupled via a respective eight-bit parallel link to the consolidation bus 56, which is advantageously an eight-bit parallel data bus. The consolidation bus 56 is coupled via an eight-bit parallel link to a FIFO 72 within the FIRM 64. The consolidation bus 56 is also coupled to the reset frame detector 66 via a link 73. The FIFO 72 in FIRM 64 that is coupled to the consolidation bus 56 is also coupled via an eight-bit parallel link to the BRM bus 58, which is advantageously an eight-bit parallel data bus. A redundant, or standby, BRM 74 is advantageously available in the BTS 36 (with connections shown as dotted-line arrows) in the event of failure of the primary BRM 52. As shown, the redundant BRM 74 includes a redundant CDSU 75.

In the BSC 34, up to eight base station communication network (BCN) ports (not shown) on the DISCO 40 are advantageously configured identically to interface with the same BTS 36. Those of skill in the art would appreciate that the BTS 36 could be configured to support any number of sectors, frequency assignments, or channels as known in the art.

The CDSU 42 provides protocol conversion between the medium speed serial link (MSSL) synchronous physical layer protocol and the synchronous E1/T1 telecommunication standard format physical layers 38. To this end the CDSU 42 is configured to recognize bundled groups of backhaul ports (not shown) and MSSL ports (also not shown). In one embodiment eight E1/T1 connections 38 per group are supported. Those of skill in the art would understand that this number need not be limited to eight. The CDSU 42 chooses a "valid" MSSL connection from the group to "listen to" and ignores the rest until the chosen connection fails. Valid status may be determined based on the activity of transmit-clock and transmit-data signals, or on the validity of the frame (i.e., as determined by, e.g., frame length, stuffing protocol, checksums, CRC bits, etc.).

The CDSU 42 configures all of the transmit-clock-in signals for a given group to be N times 1.536 MHz for T1 lines 38, and N times 1.984 MHz for E1 lines 38, where N is the number of E1/T1 lines 38 in the group. The CDSU 42 receives and distributes whole HDLC frames into the FIFOs 46 for rate translation to be transmitted down the E1/T1 lines 38. Each frame is put into one of the FIFOs 46 N times faster than the E1/T1 data rate. Frames are removed from the FIFOs 46 at a constant rate equal to the E1/T1 data rate. Whole frames are advantageously distributed according to a "round-robin" scheme. Thus, the next frame could be put into the next FIFO 46 that has enough room to accept a whole frame (47 bytes×8 bits/byte×6/5 (factoring in worst-case bit stuffing)=451 bits). Alternatively, the next frame could be put into the FIFO 46 that currently holds the lowest number of bits. As another alternative, the next frame could be put into the next FIFO 46 that contains less than a predetermined quantity of stored data.

Frames enter the FIFOs 46 relatively quickly and exit the FIFOs 46 relatively slowly. The HFD logic 44 advantageously switches FIFOs 46 between HDLC frames (or other standard-protocol frames) on boundaries denoted by delimiting flags (e.g., sync flags if the frame protocol is HDLC). Therefore, the HFD logic 44 must guarantee that each frame is delimited by sync flags. In one embodiment the HFD logic 44 switches to the next FIFO 46 at the end of a frame before the next sync flag. In an alternate embodiment, the HFD logic 44 switches to the next FIFO 46 at the end of a frame after the next sync flag.

The CDSU 42 advantageously monitors alarms and link performance states for each E1/T1 connection 38 in a group. If alarms are present on any link 38, or links 38, frames are not distributed to that link 38, or those links 38. Additionally, the CDSU 42 throttles the MSSL connection back accordingly. In the event that all E1/T1 lines 38 are defective, the HFD logic 44 may advantageously continue directing frames to the last E1/T1 line 38 that went into an alarm state.

The CDSU 42 advantageously reports the alarm status to a DISCO controller (not shown) through a management port (also not shown) in the CDSU 42. The receive-clock and transmit-clock-in frequencies are equal to (N−B)×F, where B is the number of bad E1/T1 connections 38 and F is the E1/T1 data rate, or frequency. During the time that an E1/T1 connection 38 is bad and the CDSU 42 has not yet detected the failure, frames sent on the bad E1/T1 line 38 are lost. Therefore, 1/N of the frames will be lost. Nevertheless, if a bit-level IMUX were used instead of the HFD logic 44, the entire MSSL connection would be shut down until the problem was sorted out. An IS-95 telephone call typically gets upset after a period of greater than two seconds during which no good frames have been received. The probability that all frames will be sent down the bad E1/T1 connection 38 for more than two seconds in a backhaul interface having just two E1/T1 connections 38, where one connection 38 is good, is $1/(2^{50\times 2})$, or $8\times 10^{-31}$. Thus, in the embodiment of FIG. 3, telephone calls are extremely unlikely to drop when a single E1/T1 connection 38 fails (provided at least one other E1/T1 connection 38 is good). If traffic is relatively heavy, such that the backhaul is near capacity before the E1/T1 failure, frames may be discarded after the failure in a transmit FIFO (not shown) in the DISCO 40 after the CDSU 42 has throttled back the transmit clock-in signal. A call controller (not shown) can detect this discarding and take appropriate action, including, e.g., not allowing new calls, not allowing new soft handoffs, throttling back the maximum voice rate, or dropping some calls.

The CDSU 42 is advantageously implemented with multiple cards in the BSC 34. If a particular CDSU 42 card fails, the remaining cards participating in the group will become the primary MSSL connection and the MSSL transmit rate will be throttled back accordingly. The CDSU 42 serves to handle transmit-clock-signal and transmit-data-signal gaps created by roving test (a technique described in U.S. application Ser. No. 08/832,582 filed Apr. 2, 1997, entitled RELIABLE SWITCHING BETWEEN DATA SOURCES IN A SYNCHRONOUS COMMUNICATION SYSTEM, and assigned to the assignee of the present invention). The CDSU 42 also detects network loopbacks and measures the loop time. Namely, as the CDSU 42 understands HDLC frames (or other standard-protocol frames) and can "memorize" one transmit frame per E1/T1 line 38 in a given period of time, the CDSU 42 has detected a loopback if the CDSU 42 recognizes a memorized frame returning from the same group on any of the receive network interfaces to the CDSU 42. In one embodiment the period of time is 100 milliseconds. An E1/T1 line 38 in loopback can be removed from the HFD distribution and consolidation schemes until the loopback is gone.

In the BTS 36, the E1/T1 lines 38 are passively split in the digital shelf backplane (not specifically shown) and routed to the primary and redundant BRMs 52, 74, respectively. Both the primary BRM 52 and the redundant BRM 74 include CDSU daughter cards 54, 75 that terminate the E1/T1 lines 38. The BRM-and-CDSU-card combinations are advantageously hot swappable. Additionally, the CDSU cards 54, 75 are each advantageously implemented as two cards, the second being a standby card, allowing for 1+1 redundancy.

The CDSU card 54 advantageously stores the received data in small FIFOs 68 and passes the data on to the FIRMs 60, 62 on the BRM 52. Each E1/T1 connection 38 is assigned a separate FIFO 68 on the CDSU card 54 and a separate FIFO 72 on the FIRMs 60, 62. The FIFOs 68 on the CDSU card 54 may advantageously be small because they serve only to balance transmit and receive discrepancies. The first stage of FIRM FIFOs 72 may also be small and serve as serial-to-parallel converters and HDLC terminators. Bad frames are discarded. Advantageously, there is no need for address filtering at this stage. From the FIFOs 72 on the FIRMs 60, 62, the frames are consolidated onto the consolidation bus 56. The frames may be removed from the FIFOs 72 by pulling the next frame from the fullest FIFO 72. Alternatively, the frames may be removed by cycling through the FIFOs 72 in round-robin fashion and pulling the next frame from the next FIFO 72 that contains at least one frame. As another alternative, the frames may be removed by cycling through the FIFOs 72 and pulling the next frame from the next FIFO 72 that holds at least a predefined threshold quantity of stored data. A second stage of FIFO 72 (the FIFO 72 on the FIRM 64) serves as a backhaul interface FIFO 72. Address filtering is advantageously performed at the second stage to prevent the generation of destructive infinite loops.

The tap 73 on the consolidation bus 56 between the CDSU FIRMs 60, 62 and the backhaul interface FIRM 64 delivers all received frames to the reset frame detector 66. The reset frame may be sent by a base station manager (typically a human operator, not shown) to the BTS 36 to reset the entire BTS 36. The BSM addresses the reset frame to a specific port (not shown) within the BTS 36. The reset frame is advantageously generated by software that is recognized by the reset frame detector 66 as specifying a reset frame, data that spells a predetermined word in ASCII, and a valid frame checksum. In one embodiment the ASCII word is "RST." When the reset frame is detected, the reset frame detector 66 sets a bit in a register (not shown) and asserts a nonmaskable interrupt prior to resetting the BRM 54. The reset frame detector 66 ignores frames arriving from E1/T1 lines 38 that have alarms.

During boot-up, all of the ports on the CDSU 54 are advantageously configured via nonvolatile memory (not shown) to deframe the E1/T1 lines 38 and pass the data to the consolidation FIRMs 60, 62. Only whole E1/T1 connections 38 are used. Because only good E1/T1 connections 38 are processed, engineers in the field need not populate the E1/T1 lines 38 in any particular order. Additionally, the E1/T1 lines 38 can get mixed up within a group without causing a problem. In contrast, E1/T1 numerology is critical when a bit-level IMUX is used.

The CDSU 54 may advantageously continue to process and send data to the FIRMs 60, 62 even when the CDSU 54 receives a loopback command. Namely, when the CDSU 54 is told to do a loopback (either line or payload), the HDLC frames will be routed to two locations: the FIRMs 60, 62 and the BCN transmit routing (not shown). When in loopback mode, the CDSU 54 advantageously informs the BRM 52 so that frames will not be transmitted on the loopbacked link 38.

The BRMs 52, 74 can advantageously differentiate between a failed E1/T1 connection 38 and a failed CDSU 54, 75. First, the BRM 52 detects a major line error. Second, the BRM 52 switches either the suspect, or all, transmit and receive circuitry (not shown) to the other BRM 74 (and CDSU 75). Third, the BRM 52 waits a few— advantageously three or four—seconds. Fourth, if the errors persist, they are associated with the line (i.e., the BCN); if the errors clear, they are associated with the CDSU 54, and hence the BRM 52, so the BRMs 52, 74 switch over and the faulty BRM 52 should be replaced.

Figure 4:
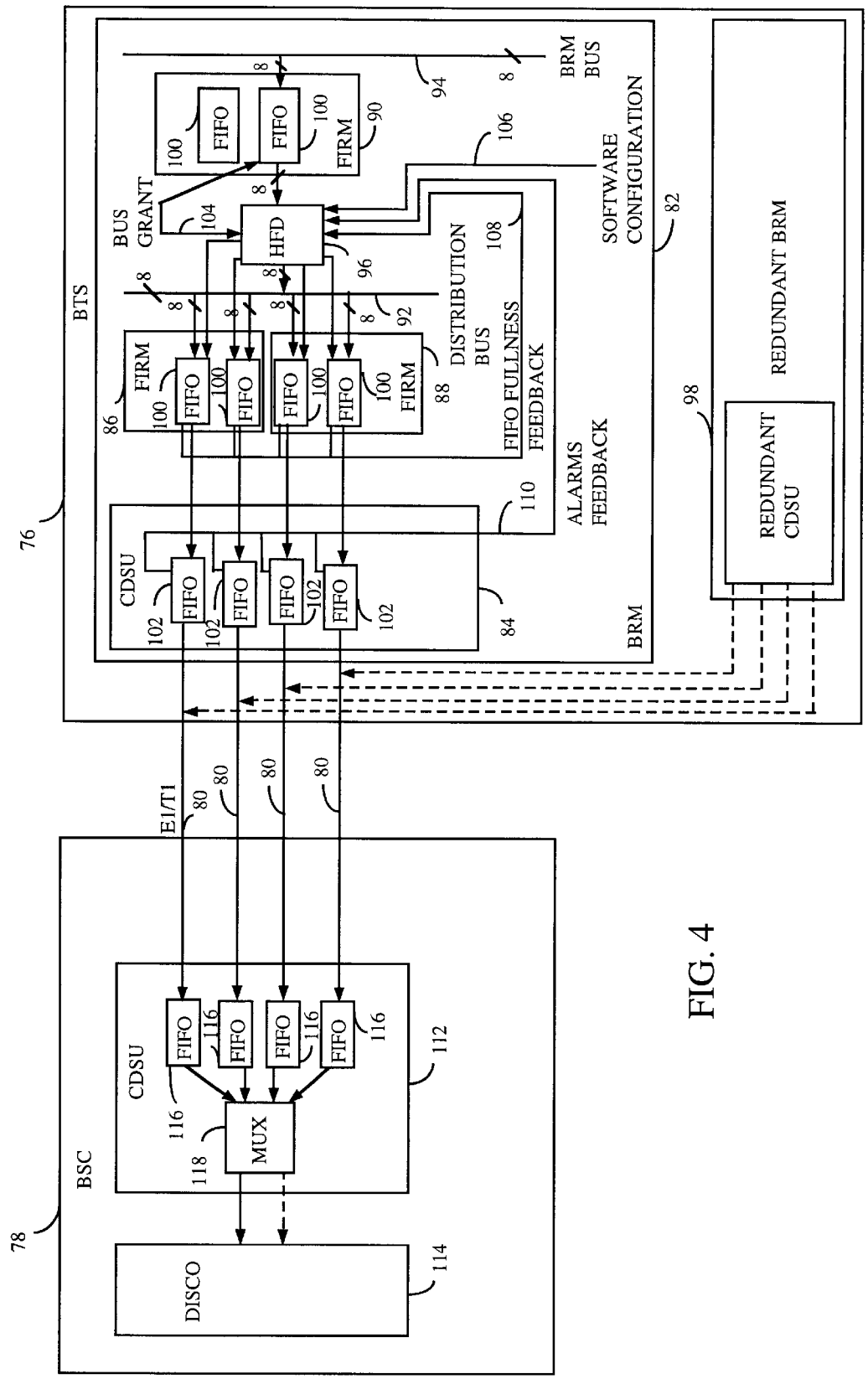
FIG. 4 is a block diagram of a one-way backhaul connection between a first type of BTS and a BSC.

In one embodiment, shown in FIG. 4, the HDLC frame distribution (HFD) algorithm effects frame-level IMUXing in a BTS 76, thereby eliminating the need for bit-level IMUXes. In the embodiment of FIG. 4, the BTS 76 is coupled to a BSC 78 via a backhaul connection comprising four E1/T1 lines 80. While only one backhaul connection and one BTS 76 are shown for simplicity, those of skill in the art would understand that the number of connections and BTSs 76 is not restricted to one. Similarly, it would be understood that the number of E1/T1 lines 80 need not be limited to four.

Within the BTS 76, a BRM 82 includes a CDSU 84, three FIRMs 86, 88, 90, a distribution bus 92, a BRM bus 94, and HFD logic 96. The FIRMs 86, 88, 90 are advantageously conventional filter/buffer entities known to those of skill in the art and available off the shelf. A second BRM 98 may advantageously be included for standby purposes. The second BRM 98 includes a standby, or redundant, CDSU 99. The redundant CDSU 99 is shown coupled to the E1/T1 lines 80 by dotted-lines, with splicing taking place in a digital shelf (not shown) within the BTS 76. Each FIRM 86, 88, 90 includes a pair of buffers 100, which are advantageously FIFOs 100. The CDSU 84 includes four FIFOs 102. Each FIFO 102 is coupled to a respective E1/T1 line 80.

The BRM bus 94, which is advantageously an eight-bit parallel data bus, is coupled via an eight-bit parallel link to a FIFO 100 in the FIRM 90. The FIFO 100 is coupled via an eight-bit parallel link to the HFD logic 96. A bus grant 104 also couples the HFD logic 96 to the FIFO 100. The HFD logic 96 has a software configuration input 106 and is coupled to the distribution bus 92, which is advantageously an eight-bit parallel data bus, via an eight-bit parallel link. The HFD logic 96 is also coupled to each FIFO 100 within the FIRMs 86 and 88. The distribution bus 92 is coupled via eight-bit parallel links to each FIFO 100 within the FIRMs 86 and 88. Although advantageously implemented with hardware such as, e.g., registers, the HFD logic 96 may alternatively be implemented with software.

A feedback tap 108 is taken from the FIFOs 100 within the FIRMs 86 and 88 and coupled to the HFD logic 96 to information to the HFD logic 96 on fullness of the FIFOs 100. Each FIFO 100 within the FIRMs 86 and 88 is coupled to a respective FIFO 102 within the CDSU 84. A feedback tap 110 is taken from framing units (not shown) associated with the FIFOs 102 and is coupled to the HFD logic 96 to provide information to the HFD logic 96 on alarm status.

Within the BSC 78, a CDSU 112 is coupled to a DISCO 114 via an MSSL connection. A second MSSL connection, shown as a dotted-line arrow, may advantageously be included for redundancy purposes. Within the CDSU 112, four FIFOs 116 are coupled to the four respective E1/T1 lines 80. The four FIFOs 116 are coupled to a multiplexer 118, which is coupled to the DISCO 114. In an alternate embodiment, the multiplexer 118 may be removed and the FIFOs 116 may be coupled directly to the DISCO 114 via four MSSL connections, one MSSL connection for each FIFO 116.

From the BRM bus 94, the backhaul interface FIFO 100 (within the backhaul interface FIRM 90) receives BCN frames not addressed to the particular BTS 76 (and thus requiring transmission to the BSC 78). These frames enter the HFD logic 96, which passes whole valid BCN frames on to the HFD FIFOs 100 (within the distribution FIRMs 86, 88), one FIFO 100 at a time, using a round-robin algorithm as described below with reference to FIG. 8. These frames enter the FIRMs 86, 88 in parallel and exit serially as HDLC frames. The HFD logic 96 directs the next frame to the next valid FIFO 100 containing less than a predetermined number of bytes of frame data. The predetermined number is advantageously sixteen bytes. Alternatively, the next frame could be put into the FIFO 100 that currently holds the lowest number of bits. As another alternative, the next frame could be put into the next FIFO 100 that has enough room to accept the frame. A valid FIFO 100 is defined as being connected (via small FIFOs 102 on the CDSU card 84) to an E1/T1 line 80 that has no alarms, as determined by the alarm feedback tap 110 to the HFD logic 96 from the CDSU card 84. In the event the alarm feedback tap 110 indicates that all E1/T1 lines 80 are defective, the HFD logic 96 may advantageously continue directing frames to the last E1/T1 line 80 that went into an alarm state.

Only one BRM 82, 98 may transmit on the E1/T1 lines 80 at any given time. The off-line BRM 98 is isolated with relays in the backplane digital shelf (not-shown) of the BTS 76. During and after system boot-up, the HFD logic 96 transmits frames onto all valid E1/T1 lines 80, which reduces the requisite configuration for the BTS 76. This also enhances the efficiency of the associated field engineers by decreasing the importance of the ordering and positioning of the E1/T1 lines 80.

When a particular E1/T1 line 80 becomes defective and the HFD logic 96 stops sending frames to the bad E1/T1 line 80, the effective data rate from the BTS 76 to the BSC 78 decreases by a factor of 1/N. If the BTS 76 was operating at close to full capacity, frames will back up and be discarded in the FIFO 100 of the backhaul interface FIRM 90. When the BRM 82 detects frames being discarded, the BRM 82 will advantageously preclude the origination of any more new telephone calls and/or new soft handoffs, throttle back the maximum voice rate, and/or drop selected calls. To halt telephone calls placed from a mobile unit to a wireline (land) unit, the BRM 82 will not need to involve the E1/T1 connections 80 or the BSC 78. For land-to-mobile calls, the BTS 76 simply sends negative-acknowledgments regarding, or ignores, paging broadcasts on a call-by-call basis. Thus, the BTS 76 will report the E1/T1 80 outage to the BSM as appropriate, but can locally reduce the data rate without involving any other network entities.

The CDSU card 84 detects network loopbacks and measures loop time by "memorizing" one HDLC transmit frame per E1/T1 line 80 every tenth of a second. This could be done in either parallel or serial format for the respective E1/T1 lines 80 (i.e., either one E1/T1 line 80 at a time, or all E1/T1 lines 80 together). Those of skill in the art would understand that the tenth-second time period is arbitrary and may be configured as any desired time period. If the CDSU 84 detects the memorized frame returning on any of the receive network interfaces, the CDSU 84 registers a loopback. The CDSU 84 then sends a loopback detection code out of the port for the network interface in loopback. While the CDSU 84 detects the loopback detection code returning on the E1/T1 line 80, the CDSU 84 continues to assume a loopback. The CDSU 84 advantageously ignores the BRM 82 transmit data, instead sending the appropriate loopback detection code (also referred to as a loopback detection sequence). When the CDSU 84 stops detecting the loopback detection code returning on the E1/T1 line 80, the CDSU 84 determines that the E1/T1 line 80 is no longer in loopback. In an alternate embodiment, loopback detection is performed via the HFD distribution bus 92 and the consolidation bus 56 (see FIG. 3). In a particular embodiment, one frame is memorized every 100 milliseconds. This could be done in either parallel or serial format for the respective E1/T1 lines 80 (i.e., either one E1/T1 line 80 at a time, or all E1/T1 lines 80 together). If that frame returns within 100 milliseconds on the consolidation bus 56 (FIG. 3), a loopback is declared. The time interval between the frame being on the distribution bus 92 and, subsequently, on the consolidation bus 56 (FIG. 3) is reported, along with the identities of the applicable input and output ports.

In loop timing mode, the CDSU card 84 uses a receive-data signal from the E1/T1 lines 80 to derive transmit timing for the E1/T1 lines 80. If a receive-data signal is not valid for one of the E1/T1 lines 80, the CDSU card 84 simply uses another, valid E1/T1 line 80 for timing. If all of the E1/T1 lines 80 are bad, the CDSU 84 advantageously still transmits valid transmit-data-signal timing for the E1/T1 lines 80.

In the BSC 78, the CDSU 112 receives and deframes the data from the E1/T1 lines 80. The frames may be removed from the FIFOs 116 by pulling the next frame from the fullest FIFO 116. Alternatively, the frames may be removed by cycling through the FIFOs 116 in round-robin fashion and pulling the next frame from the next FIFO 116 that contains at least one frame. As another alternative, the frames may be removed by cycling through the FIFOs 116 and pulling the next frame from the next FIFO 116 that holds at least a predefined threshold quantity of stored data. The HDLC data is advantageously sent through the multiplexer 118 and passed on to the DISCO 114 via the MSSL connection. Alternatively, multiple MSSL connections directly to the DISCO 114 may be used, there being one active MSSL connection per E1/T1 line 80. In an embodiment employing multiple MSSL connections (and no multiplexer 118) the receive data rate for the DISCO 114 is 1.536 MHz for T1 data and 1.984 MHz for E1 data. Thus, the transmit data rate advantageously differs from the receive data rate for the DISCO 114, which minimizes the FIFO depth requirements on the receive FIFOs 116. On the other hand, it may be desired to balance the transmit and receive data rates. Accordingly, in the embodiment depicted in FIG. 4, all of the E1/T1 lines 80 are combined via the multiplexer 118 into one MSSL connection from the CDSU 112 in order to balance the transmit and receive data rates. In the DISCO 114, BCN receive address filters (not shown) complement BCN transmit address filters (also not shown) to prevent the formation of destructive infinite loops.

Figure 5:
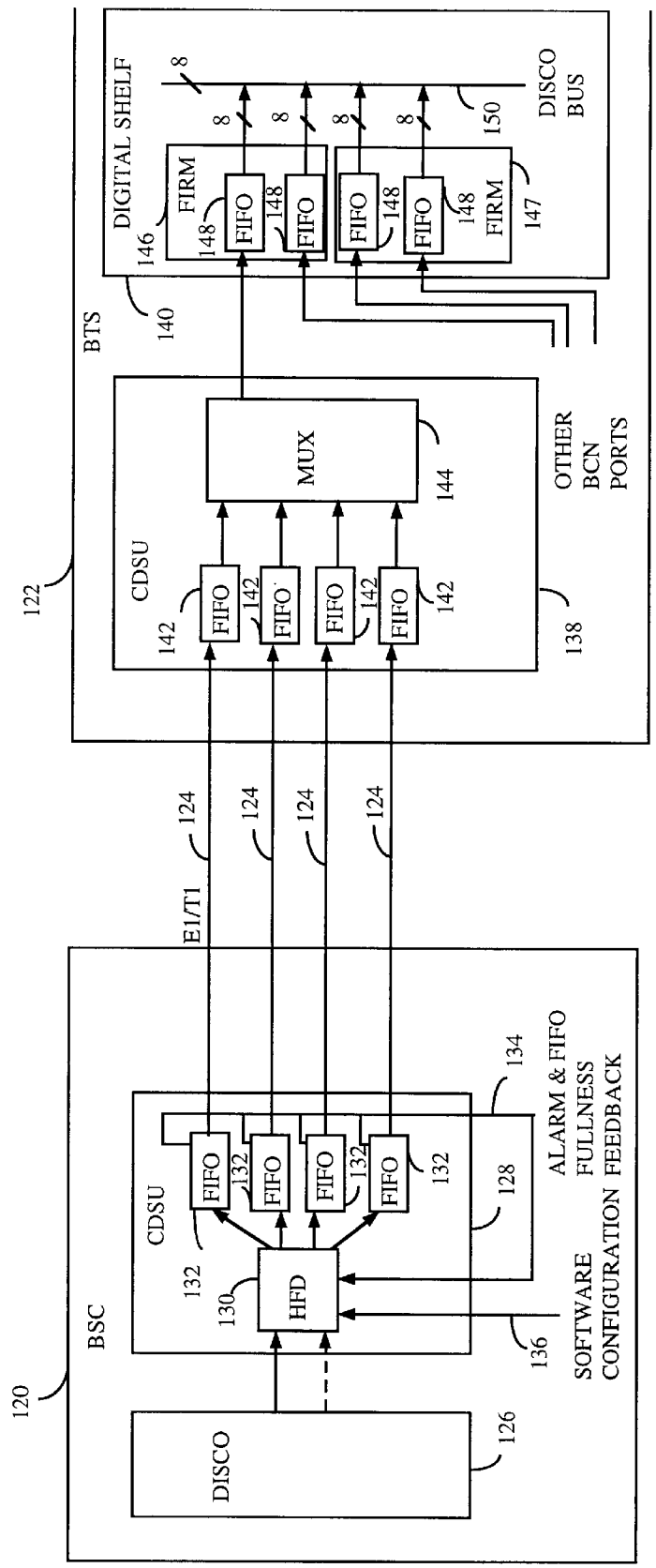
FIG. 5 is a block diagram of a one-way backhaul connection between a BSC and a second type of BTS.

In one embodiment a BSC 120 may be coupled to an alternate type of BTS 122, as illustrated in FIG. 5. Thus, the BSC 120 is coupled to the BTS 122 via a backhaul connection comprising four E1/T1 lines 124. While only one backhaul connection and one BTS 122 are shown for simplicity, those of skill in the art would understand that the number of connections and BTSs 122 is not restricted to one. Similarly, it would be understood that the number of E1/T1 lines 124 need not be limited to four.

Within the BSC 120, a DISCO 126 is coupled to a CDSU 128. Redundant, or standby, coupling (depicted as a dotted-line arrow) is advantageously available. Within the CDSU 128, HFD logic 130 is coupled to four buffers 132, which are advantageously FIFOs 132, there being one FIFO 132 coupled to each respective E1/T1 line 124. A feedback tap 134 is taken from framing units (not shown) associated with each FIFO 132 and is coupled to the HFD logic 130, providing information on alarms and fullness of the respective FIFOs 132 to the HFD logic 130. The HFD logic 130 also includes an input 136 for software configuration. Although advantageously implemented with hardware such as, e.g., registers, the HFD logic 130 may alternatively be implemented with software.

Within the BTS 122, a CDSU 138 is coupled to a digital shelf 140. On the CDSU 138, four FIFOs 142 are each coupled to a respective E1/T1 line 124. The FIFOs 142 are coupled to a multiplexer 144, also on the CDSU 138. In the digital shelf 140, first and second FIRMs 146, 147 each advantageously include two FIFOs 148. Each FIFO 148 is advantageously coupled via respective eight-bit parallel links to a DISCO bus 150, which is advantageously an eight-bit parallel data bus. The FIRMs 146, 147 are advantageously conventional filter/buffer entities known to those of skill in the art and available off the shelf. A first FIFO 148 within the first FIRM 146 is coupled via a BCN port to an output from the multiplexer 144. The remaining FIFOs 148 within the FIRMs 146, 147 are coupled to other BCN ports.

Signal processing and functionality of the BSC 120 have been described above in connection with the BSC 34 of FIG. 3. Signal processing and functionality of the BTS 122 have been described above in connection with the BTS 36 of FIG. 3, with the following differences. Because the DISCO bus 150 in the BTS 122 includes only one connection, the multiplexer 144 is necessary to allow the CDSU 138 to multiplex the multiple E1/T1 lines 124 into a single, high-speed link. Additionally, in the event of an alarm on a given E1/T1 line 124, the MSSL speed is throttled back.

Figure 6:
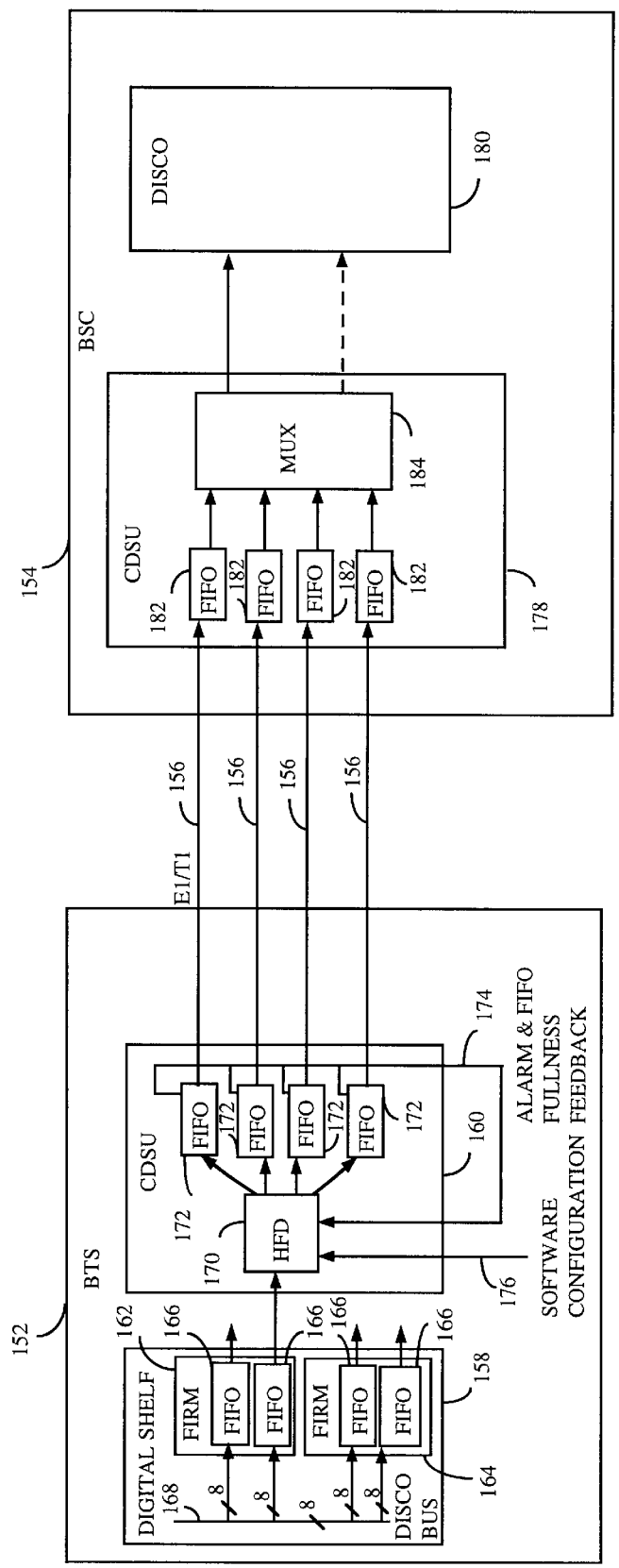
FIG. 6 is a block diagram of a one-way backhaul connection between a second type of BTS and a BSC.

In one embodiment an alternate type of BTS 152 may be coupled to a BSC 154 as shown in FIG. 6. Thus, the BTS 152 is coupled to the BSC 154 via a backhaul connection comprising four E1/T1 lines 156. While only one backhaul connection and one BTS 152 are shown for simplicity, those of skill in the art would understand that the number of connections and BTSs 152 is not restricted to one. Similarly, it would be understood that the number of E1/T1 lines 156 need not be limited to four.

Within the BTS 152, a digital shelf 158 is coupled to a CDSU 160. In the digital shelf 158, first and second FIRMs 162, 164 each advantageously include two FIFOs 166. Each FIFO 166 is advantageously coupled via respective eight-bit parallel links to a DISCO bus 168, which is advantageously an eight-bit parallel data bus. The FIRMs 162, 164 are advantageously conventional filter/buffer entities known to those of skill in the art and available off the shelf. One FIFO 166 in the FIRM 162 is coupled to HFD logic 170 in the CDSU 160. Within the CDSU 160, the HFD logic 170 is coupled to four buffers 172, which are advantageously FIFOs 172, there being one FIFO 172 coupled to each respective E1/T1 line 156. A feedback tap 174 is taken from framing units (not shown) associated with each FIFO 172 and is coupled to the HFD logic 170, providing information on alarms and fullness of the respective FIFOs 172 to the HFD logic 170. The HFD logic 170 also includes an input 176 for software configuration. Although advantageously implemented with hardware such as, e.g., registers, the HFD logic 170 may alternatively be implemented with software.

Within the BSC 154, a CDSU 178 is coupled to a DISCO 180. Redundant, or standby, coupling (depicted as a dotted-line arrow) is advantageously available. On the CDSU 178, four FIFOs 182 are each coupled to a respective E1/T1 line 156. The FIFOs 182 are coupled to a multiplexer 184, also on the CDSU 178, which multiplexer 184 is coupled to the DISCO 180.

Signal processing and functionality of the BSC 154 have been described above in connection with the BSC 78 of FIG. 4. Transmit signal processing for the CDSU 160 in the BTS 152 is similar to the transmit signal processing for the BSC 154, except that there is only one MSSL connection between the DISCO bus 168 and the CDSU 160.

In one embodiment first and second BSCs may be coupled through a plurality of E1/T1 lines. It would be apparent to those of skill in the art that a BSC configured like the BSC 34 of FIG. 3 or the BSC 120 of FIG. 5 may be coupled to transmit across multiple E1/T1 connections to a BSC configured like the BSC 78 of FIG. 4 or the BSC 154 of FIG. 6. Additionally, it would be apparent to those skilled in the art that a BSC may be connected to a BTS that uses a DISCO and a CDSU similarly to the BSCs shown in any of FIGS. 3–6.

In the embodiments described herein, the software configuration ports used to manage the CDSUs are advantageously management interfaces such as, e.g., RS232, asynchronous serial, synchronous serial, or memory mapped interfaces. Configuration, alarms, and reports are advantageously passed in table format. The CDSUs are advantageously designed for remote software upgrade. Thus, the BSC transmits new CDSU software and/or firmware to the BRM in the BTS, and the BRM routes the new software and/or firmware to the CDSU via the management interface. The CDSU advantageously stores the new code in a shadow memory, verifying cyclic redundancy check bits before upgrading to the new platform. The CDSU may reset or reboot in order to implement a software switchover.

Figure 7:
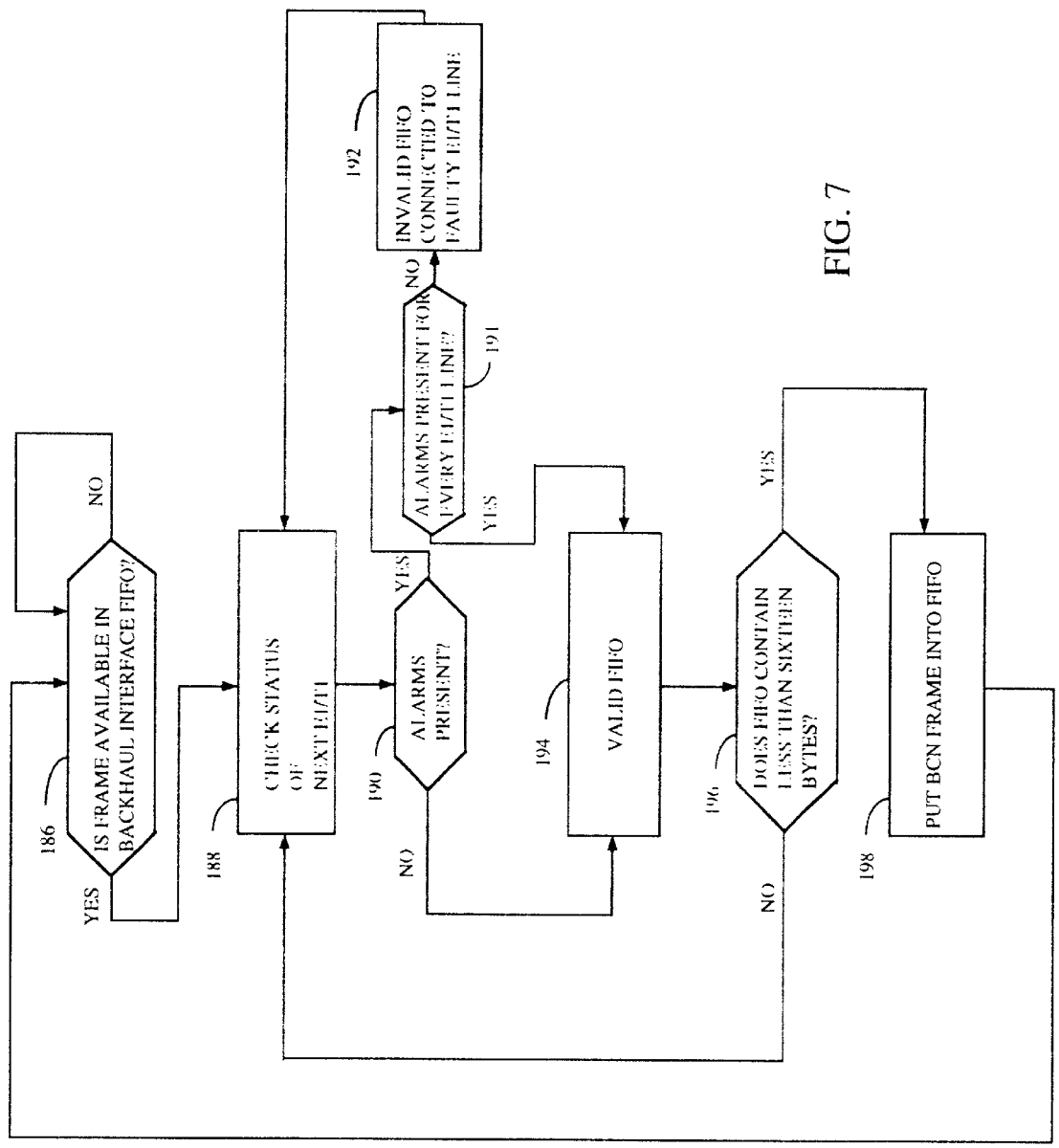
FIG. 7 is a flowchart of an algorithm for inverse multiplexing data frames to be transmitted across a backhaul connection between point-to-point entities in a telecommunications network.

In one embodiment an HFD algorithm effects frame-level inverse multiplexing according to the flowchart shown in FIG. 7. In step 186 the HFD logic checks whether a frame is available in the backhaul interface FIFO. If a frame is not available, the HFD algorithm returns to step 186 and continues checking for an available frame in the backhaul interface FIFO. If a frame is available in the backhaul interface FIFO, the HFD algorithm proceeds to step 188 and checks the status of the next E1/T1 line. The HFD algorithm then proceeds to step 190 and determines whether alarms are present for the next E1/T1 line by monitoring the alarm feedback signal of that E1/T1 line. If alarms are present, the HFD algorithm proceeds to step 191 and determines whether alarms are present on every E1/T1 line. If alarms are not present on every E1/T1 line, the HFD algorithm proceeds to step 192, in which the FIFO associated with the E1/T1 line for which alarms are present is flagged as an invalid FIFO connected to a faulty E1/T1 line. The HFD algorithm then returns to step 188 and checks the status of the next E1/T1 line. If either alarms are not present in step 190, or if every E1/T1 line is determined in step 191 to have alarms present, the HFD algorithm proceeds to step 194, labeling the FIFO associated with the E1/T1 line a valid FIFO. The HFD algorithm then proceeds to step 196 and determines whether the FIFO contains less than sixteen bytes, which is a predetermined threshold number. If the FIFO does not contain less than sixteen bytes, the HFD algorithm returns to step 188 and checks the status of the next E1/T1 line. If the FIFO in step 196 contains less than sixteen bytes, the HFD algorithm puts the frame into the FIFO and returns to step 186 to check if another frame is available in the backhaul interface FIFO.

Figure 8:
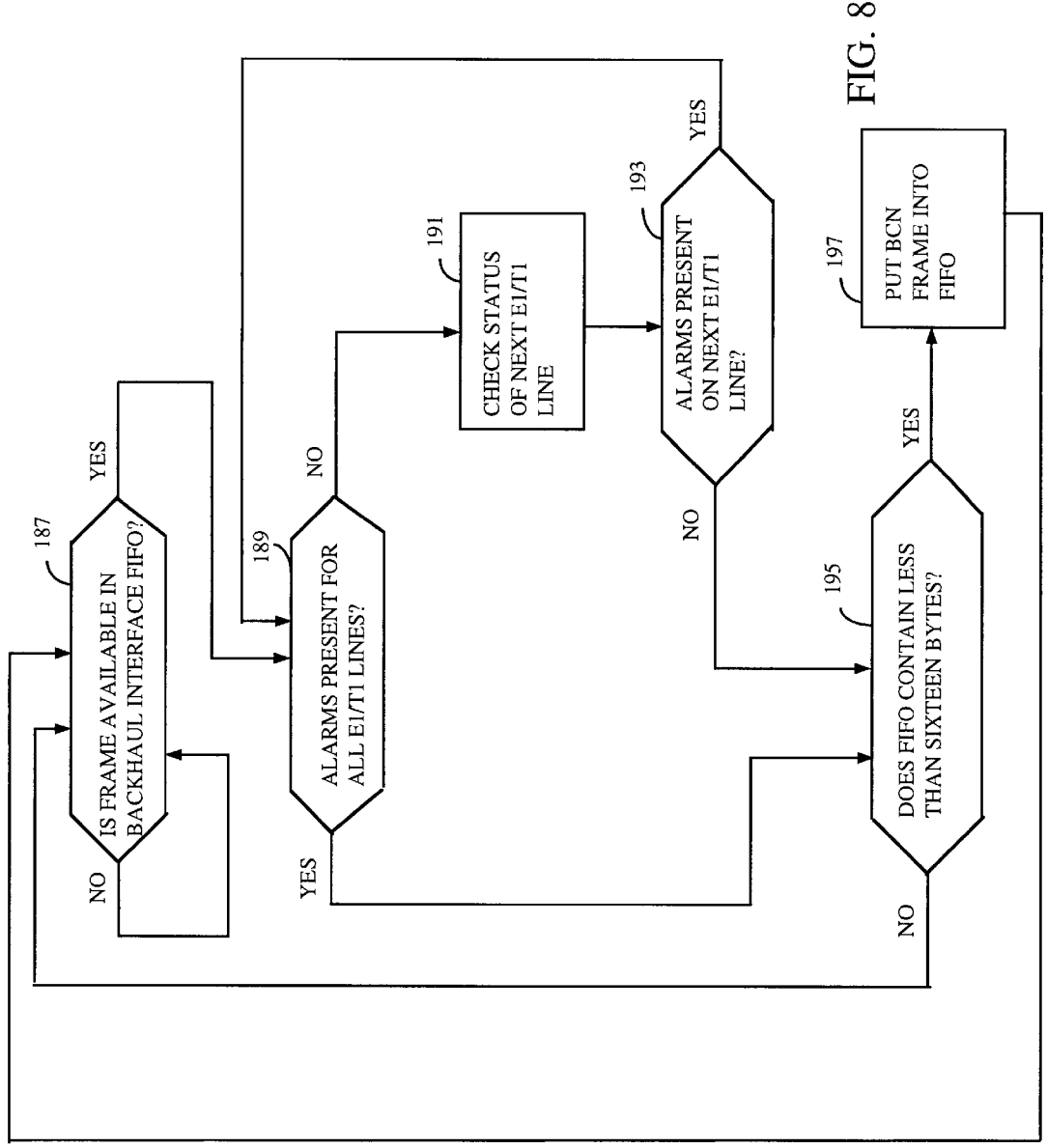
FIG. 8 is a flowchart of an algorithm for inverse multiplexing data frames to be transmitted across a backhaul connection between point-to-point entities in a telecommunications network.

In another embodiment an HFD algorithm effects frame-level inverse multiplexing according to the flowchart shown in FIG. 8. In step 187 the HFD algorithm determines whether a frame is available in the backhaul interface FIFO. If a frame is not available, the HFD algorithm returns to step 187 and checks again. If a frame is available, the HFD algorithm proceeds to step 189. In step 189 the HFD algorithm checks whether alarms are present for all E1/T1 lines. If alarms are not present on at least one E1/T1 line, the HFD algorithm proceeds to step 191. In step 191 the HFD algorithm checks the status of the next E1/T1 line. The HFD algorithm then proceeds to step 193. In step 193 the HFD algorithm checks whether alarms are present for the next E1/T1 line. If alarms are present for the E1/T1 line, the HFD algorithm returns to step 189. If alarms are not present for the E1/T1 line, the HFD algorithm proceeds to step 195. If in step 189 the HFD algorithm determines that alarms are present for every E1/T1 line, the HFD algorithm proceeds to step 195. In step 195 the HFD algorithm checks whether the FIFO associated with the next E1/T1 line contains less than sixteen bytes, which is a predetermined threshold number. (Of course, if alarms are present for every E1/T1 line, the "next" FIFO is the current FIFO.) If the FIFO contains less than sixteen bytes, the HFD algorithm proceeds to step 197. If the FIFO does not contain less than sixteen bytes, the HFD algorithm returns to step 187 to check for available frames in the backhaul interface FIFO. If every FIFO contains greater than or equal to sixteen bytes, frames are held in the backhaul interface FIFO until at least one valid FIFO has less than sixteen bytes. In step 197 the HFD algorithm puts the BCN frame into that FIFO. The HFD algorithm then returns to step 187 to check for the next available frame in the backhaul interface FIFO.

When the HFD algorithm has run through every step in the flowchart of FIG. 7, or alternatively, in the flowchart of FIG. 8, a BCN frame has been placed in a FIFO. Placement of BCN frames into FIFOs occurs in parallel at a rate exceeding the E1/T1 data rate. HDLC frames are removed serially from the FIFOs at a constant E1/T1 data rate.

The FIFO depth required for the HFD FIFOs (see, e.g., FIFOs 100 in FIRMs 86, 88 of FIG. 4) is a function of the maximum-length HDLC frame (typically 451 bits) that exits the HFD FIFOs, the number of E1/T1 lines supported (N), and the type of HFD algorithm employed (i.e., either the HFD algorithm of FIG. 7, or a least-full FIFO algorithm). When the next frame is put into the FIFO with the least bits, the following equation applies:

FIFO Depth Required=$2(N-1)$(Max. Frame Length)/N

However, if some of the least-significant bits representing the FIFO depth are not used in the calculation that determines the next target FIFO, a larger FIFO is required, yielding the following equation (in which x represents the number of missing bits) for FIFO depth:

FIFO Depth Required<$2(N-1)$(Max. Frame Length)/N+$2^x-1$

In one embodiment each E1/T1 connection is fed by one, 1024-bit HFD FIFO and nine bits are discarded from the above minimum-FIFO-depth calculation.

Those of skill in the art would understand that the sixteen-byte threshold for the HFD algorithms of FIGS. 7–8 is arbitrary and could equally well be a different number. Nevertheless, it is advantageous to establish a sixteen-byte threshold. In the BTS 76 of FIG. 4, by way of example, the HFD algorithms of FIGS. 7–8 are implemented in three FIRMs 86, 88, 90 and the HFD logic 96. Each FIFO 100 in the HFD FIRMs 86, 88 includes a programmable "almost-full" indicator. This threshold is advantageously programmable in sixteen-byte increments, although any other increment could be substituted for the sixteen-byte increment. If this threshold is programmed to sixteen bytes, the HFD logic 96 will give the next frame to the next FIFO 100 that has sixteen or less bytes full. If all of the valid paths (i.e., the paths for which no alarm feedback has been received by the HFD logic 96) have more than sixteen bytes in their respective FIFOs 100, the frames will back up in the backhaul interface FIFO 100 in the backhaul interface FIRM 90. A maximum-length frame of forty-seven bytes can advantageously be loaded in parallel into a FIRM 86, 88 using a 19.6608 MHz system-clock signal in 2.39 microseconds. The sixteen bytes will require at least 62.5 microseconds to exit the FIRM 86, 88 at the E1 data rate of 2.048 megabits per second. Thus, given a constant stream of transmit data, all of the E1/T1 lines 80 will remain busy.

The HFD algorithms herein described relate only to sending data packets (and not to receiving data packets). Thus, and in light of the highly standardized nature of telephone-company interfaces, those of skill in the art would understand that it is possible to equip a given BSC with a CDSU from one vendor, and a given BTS in the same network with a CDSU from a different vendor.

In the embodiments herein described, HFD algorithms are applied to the interfaces between a BSC and a BTS, and between a pair of BSCs, in a cellular telephone system. Those of skill in the art would understand that the HFD algorithms as herein described lend themselves equally well to any interface connecting point-to-point entities in a wide-area network such that high-speed data frames must be multiplexed onto several lower-speed interface connections for transmission between the entities.

Moreover, it would be understood that the HFD algorithms as herein described need not be restricted to use in any one, specific implementation. The embodiments herein described are tailored to four interfaces, shelved or rack-mountable hardware, and components mounted on daughter cards. Nevertheless, the HFD algorithms need not be limited to use with such devices, and may be used with any substitutable alternatives known in the art.

Figure 9:
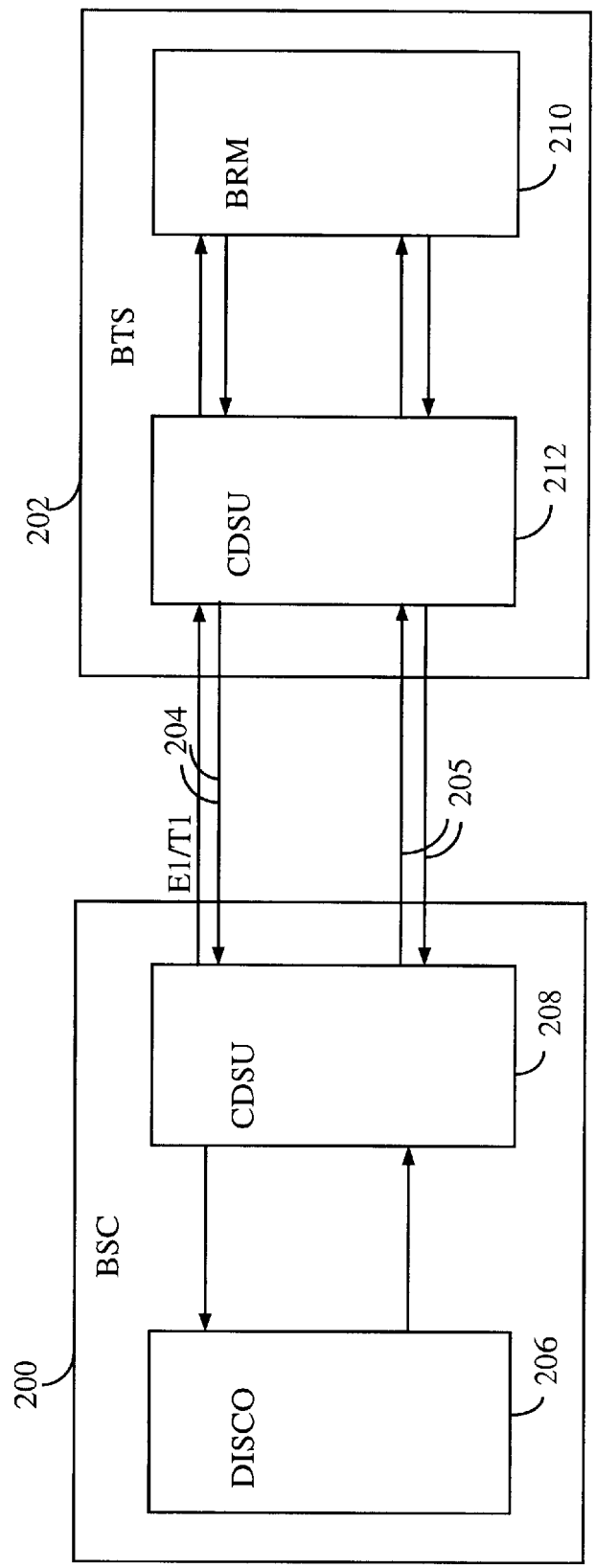
FIG. 9 is a block diagram of a backhaul connection between a BSC and a BTS.

In one embodiment the BSC 200 may be coupled to a given BTS 202 through a backhaul connection comprising multiple E1/T1 lines 204, 205 as shown in FIG. 9. While only two E1/T1 connections 204, 205 are shown, those of skill in the art would understand that the number of E1/T1 connections 204, 205 need not be limited to two. The BSC 200 may advantageously include a distribution and consolidation unit (DISCO) 206 coupled to a channel and data service unit (CDSU) 208, substantially as described above with reference to FIG. 2. The BTS 202 may advantageously include a base station router module (BRM) 210 coupled to a CDSU 212, also substantially as described above in connection with FIG. 2. The CDSU 212 may advantageously be implemented as cards, with one redundant CDSU card 212 being provided in the event of failure of the primary CDSU card 212.

In the embodiments described below, loopbacks may be detected by either the BTS 202 or the BSC 200. When a loopback is detected, the E1/T1 interface 205 that is looping is not used for real point-to-point data. Instead, a loopback detect sequence (LDS) is sent to flag the link 205 and notify the far end of the loopback. The BSC 200 or the BTS 202 detects when the loopback is gone and begins using the link 205 for real transmit and receive data again, notifying the far end that the loopback is gone.

Figure 10:
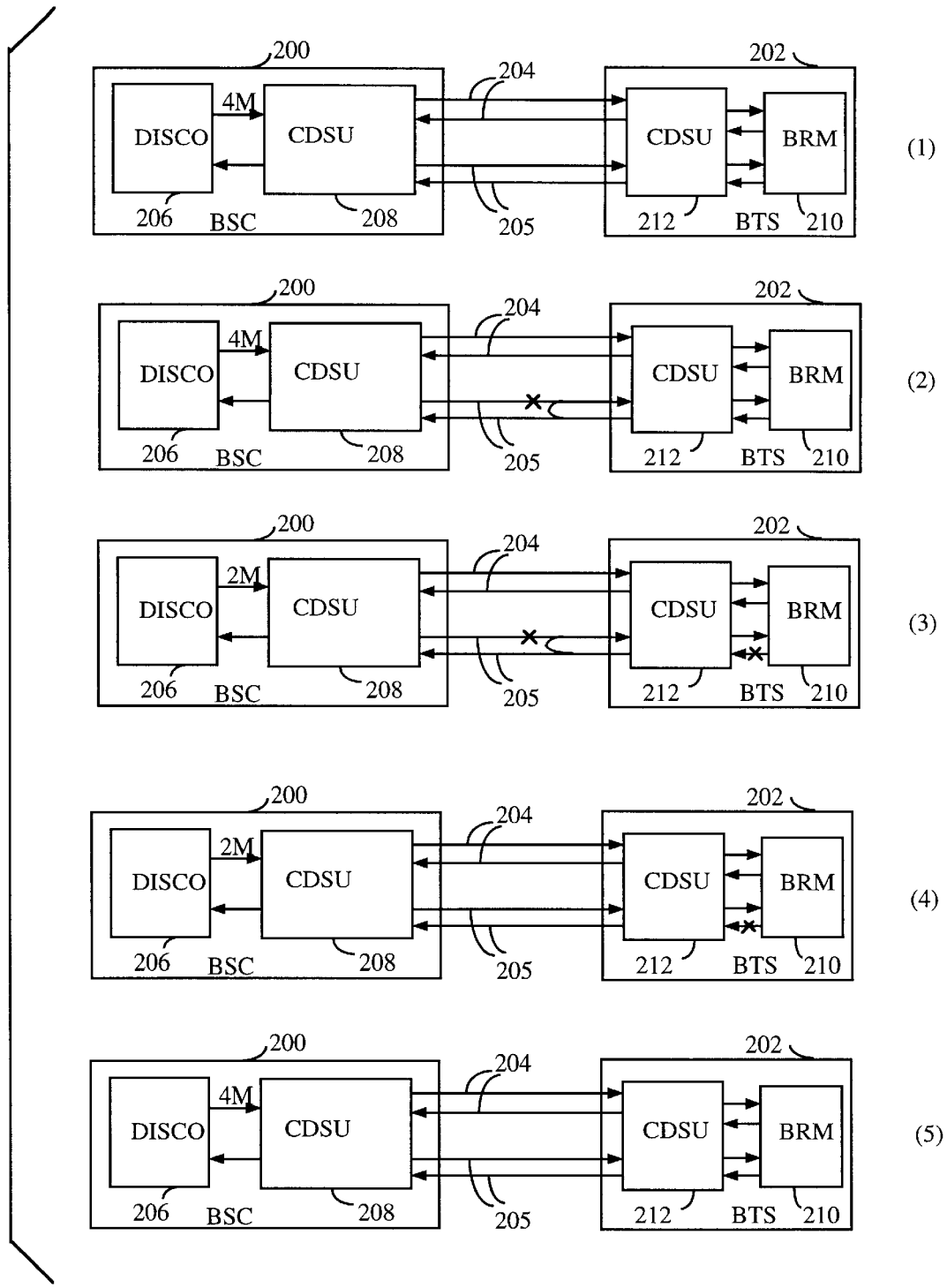
FIG. 10 is a block diagram of the backhaul connection of FIG. 8, illustrating five states of activity when the BTS detects a loopback.

In one embodiment, in which frames are being looped back to the BTS 202, the BTS 202 detects the loopback and the system goes through the states of activity depicted in FIG. 10. In state (1), before the loopup has occurred, operations are normal. Data is transferred from the DISCO 206 to the CDSU 208 at a given rate, advantageously four megabits per second (Mbps). In state (2), after a loopup has occurred, some frames of data are being lost. HDLC Frame Distribution (HFD) hardware (not shown) within the BRM 210 detects the loopup facing the BTS 202 on the E1/T1 line 205 as follows. The BRM 210 advantageously samples the transmit data to one of its valid ports ten times per second. If the BRM 210 encounters any of this data returning on any of its receive ports, the BRM 210 flags the particular port as being in loopback and advantageously records the time between when the frame was transmitted and when it was received, giving an operator, or BSM, information as to where along the network interface 205 the loopback is located.

In state (3), after the loopup has been detected, it is tolerated. Software from the BRM 210 instructs the CDSU 212 to send a predetermined sequence of bits out of the port connected to the E1/T1 line 205 in loopback. The bit sequence, or BTS loopback detect sequence (BTSLDS) is sent by the CDSU 212 on the E1/T1 line 205. The BTSLDS is received by both the BSC 200 and the BTS 202, as shown, because the BTSLDS returns to the BTS 202 due to the loopback. Hence, both the BSC 200 and the BTS 202 will know not to use the loopbacked line 205 for real data. In a particular embodiment, when the BTSLDS returns to the CDSU 212, the CDSU 212 flags the return by, e.g., turning off a green LED (not shown) for the port connected to the loopbacked line 205. The BRM 210 software determines whether the BTSLDS has been received at the CDSU 212, and the HFD hardware within the BRM 210 detects the turned-off LED. As a result, the HFD hardware stops placing data frames onto the link 205 (while advantageously continuing to send sync flags) and indicates to a base station manager (BSM) (typically an operator, not shown) that the link 205 is in loopback by, e.g., enabling a red network interface LED for the link 205 in question.

Still in state (3), the CDSU 208 in the BSC 200 detects the BTSLDS on the link 205 via the CDSU 208 port connected to that link 205, and consequently stops using that port. Although the CDSU 208 stops putting data frames on the link 205, sync flags are still advantageously sent. The CDSU 208 adjusts its data terminal equipment (not shown) to accept data frames from the DISCO 206 at half the prior data rate, e.g., at two Mbps, to compensate for the fact that half of the available E1/T1 lines 204, 205 are not being used. The proportional rate adjustment varies with the total number of E1/T1 lines 204, 205 and the number of lines 204, 205 in loopback.

In state (4), after loopdown (i.e., after the loopback is gone), the CDSU 208 in the BSC 200 continues to encounter the BTSLDS arriving on the E1/T1 link 205, and thus does not use the link 205 for real data frames, sending only sync flags. The CDSU 212 in the BTS 202, which continues to send the BTSLDS on the link 205 under the direction of the BRM 210 software, stops detecting the BTSLDS returning on the link 205. In a specific embodiment, the CDSU 212 detects that no BTSLDS frames are returning on the link 205 and informs the BRM 210 that the CDSU 212 is not detecting a received BTSLDS on the link 205. Accordingly, the BRM 210 software instructs the CDSU 212 to stop sending the BTSLDS on the link 205. A few seconds later, the CDSU 212 notifies the BRM 210 by, e.g., enabling a green LED so that the BRM 210 can send frames to the link 205.

In state (5), after loopdown, the BSC 200 is cleared. When the HFD hardware in the BRM 210 detects the enabled LED, the HFD hardware begins putting data frames on the link 205 again. Once the HFD hardware in the BRM 210 stops detecting the loopback (i.e., once the HFD hardware stops detecting the same frame returning on the same link after a given period of time such as, e.g., 100 milliseconds), the BRM 210 may advantageously report the loopdown to the BSM. The CDSU 208 in the BSC 200 stops detecting the BTSLDS on the link 205, and begins using the link 205 again. The CDSU 208 readjusts its data terminal equipment to accept data frames from the DISCO 206 at the normal data rate, advantageously four Mbps. A controller (not shown) in the DISCO 206 may advantageously poll the CDSU 208 to determine that loopdown has occurred and notify the BSM.

Figure 11:
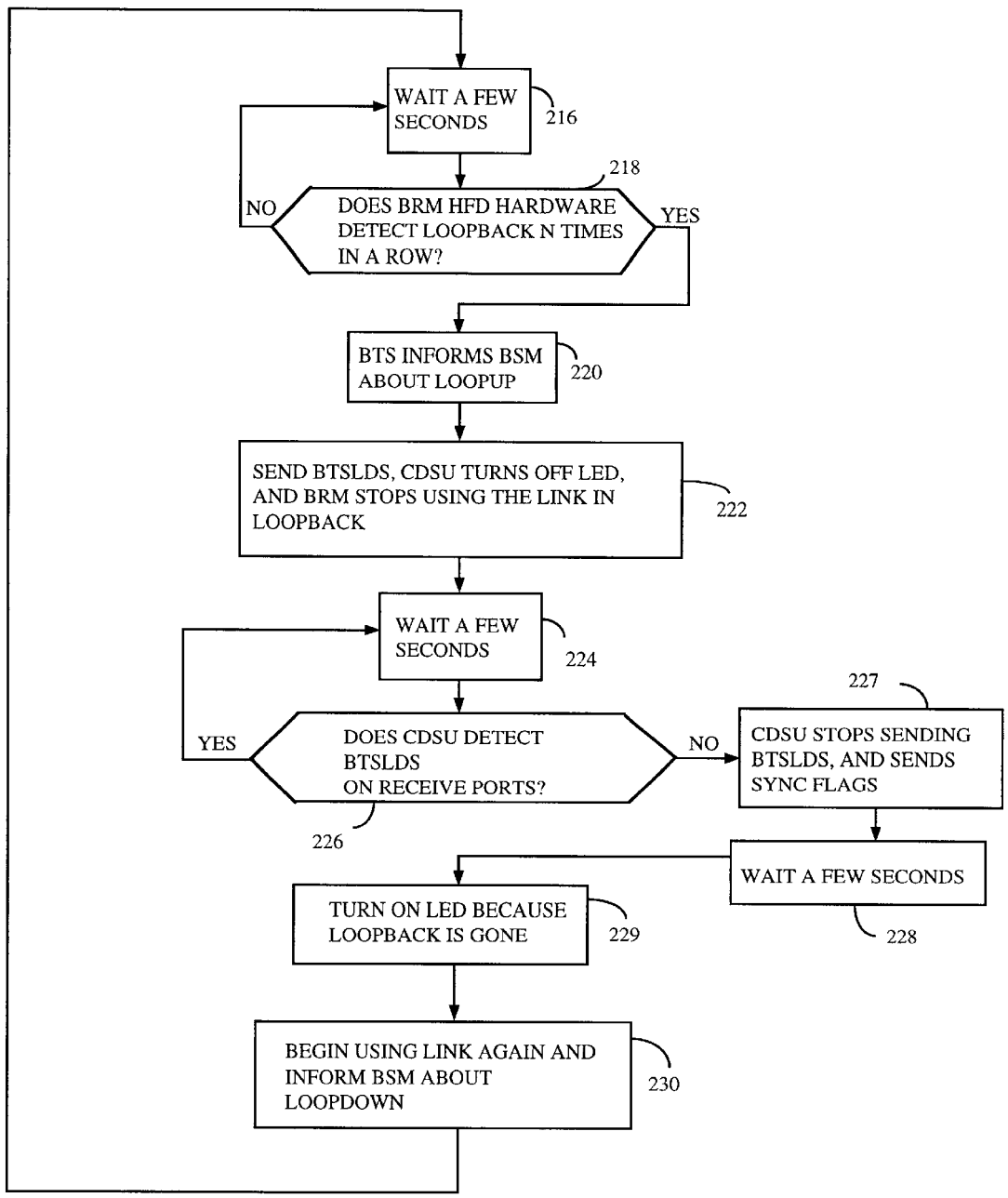
FIG. 11 is a flowchart of BTS steps in an algorithm for processing a loopback detected by a BTS.

In one embodiment the BTS engages in the steps shown in FIG. 11 when facing a loop. In step 216 the BTS waits a few seconds, e.g., two seconds, before proceeding to step 218. In an alternate embodiment the step 216 of waiting a few seconds could be replaced by a step of using an interrupt-driven mechanism, which could decrease loopback detection times. In step 218 the HFD hardware in the BRM of the BTS detects a loopback. If the loopback has not been detected a predefined number of times in a row, the BTS returns to step 216. If, on the other hand, the loopback has been detected a predefined number of times in a row, the BTS proceeds to step 220. In one embodiment the predefined number of times N is three times. In step 220 the BTS informs the BSM about the loopup. The BTS then proceeds to step 222. In step 222 the BTS sends the BTSLDS on the E1/T1 link in loopback, the CDSU within the BTS turns off an LED associated with the port connected to the link in loopback, and the BRM stops using the link in loopback because the LED is off. The BTS then proceeds to step 224, waiting a few seconds, e.g., two seconds, before proceeding to step 226. In step 226, if the CDSU detects the BTSLDS on the receive port for the link in loopback, the BTS returns to step 224. If, on the other hand, in step 226 the CDSU does not detect the BTSLDS on the particular receive port, the BTS proceeds to step 227. In step 227 the CDSU stops sending the BTSLDS and sends sync flags instead. The BTS then proceeds to step 228, waiting a few seconds, e.g., two seconds, before proceeding to step 229. In step 229 the LED is turned on to signal that the loopback is gone. The BTS then proceeds to step 230. In step 230 the BTS begins using the link for real data again and informs the BSM about the loopdown. The BTS then returns to step 216.

Figure 12:
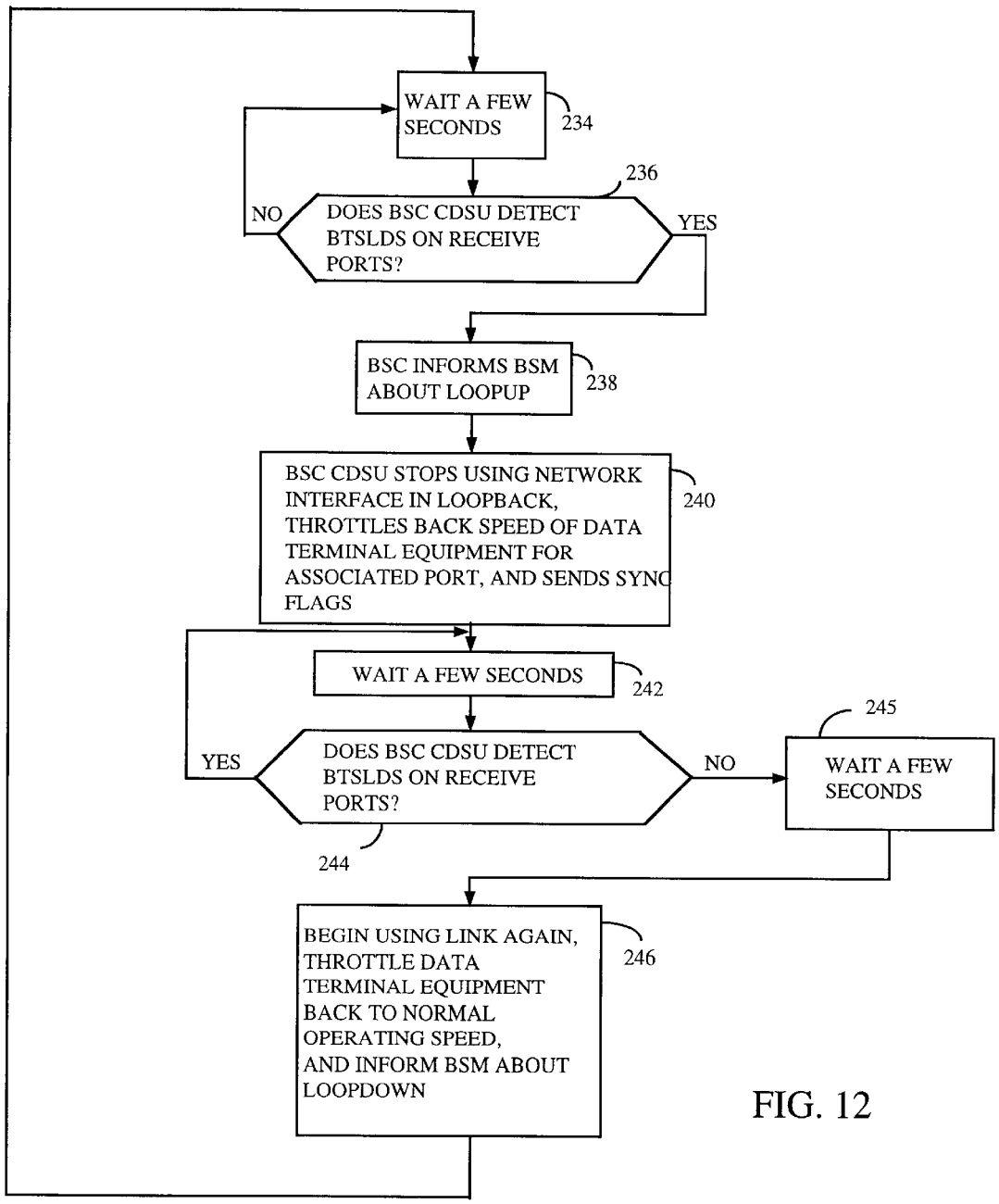
FIG. 12 is a flowchart of BSC steps in an algorithm for processing a loopback detected by a BTS.

In one embodiment the BSC engages in the steps shown in FIG. 12 when the BTS is facing a loop. In step 234 the BSC waits a few seconds, e.g., two seconds, before proceeding to step 236. In an alternate embodiment the step 234 of waiting a few seconds could be replaced by a step of using an interrupt-driven mechanism, which could decrease loopback detection times. In step 236, if the CDSU in the BSC detects the BTSLDS on any receive port, the BSC proceeds to step 238. But if in step 236 the BTSLDS is not detected, the BSC returns to step 234. In step 238 the BSC informs the BSM about the loopup. The BSC then proceeds to step 240. In step 240 the BSC stops using for real data the network interface corresponding to the port on which the BTSLDS was detected, throttles back the data terminal equipment to decrease the data rate from the DISCO, and sends sync flags through the port at which the BTSLDS was detected. The BSC then proceeds to step 242, waiting a few seconds, e.g., two seconds, before proceeding to step 244. In step 244, if the CDSU in the BSC still detects the BTSLDS on any receive port, the BSC returns to step 242. If, on the other hand, the BTSLDS is not detected in step 244, the BSC proceeds to step 245. In step 245 the BSC waits a few seconds, e.g., two seconds, before proceeding to step 246. In step 246 the BSC begins using the link for real data again, throttles the data terminal equipment back to normal operating speed, and informs the BSM about the loopdown. The BTS then returns to step 234. It should be noted that the transmit and receive speeds may advantageously be throttled back to normal operating speed asymmetrically. Thus, the receive speed may be throttled back to normal operating speed a few seconds before the transmit speed is throttled back to normal operating speed.

Figure 13:
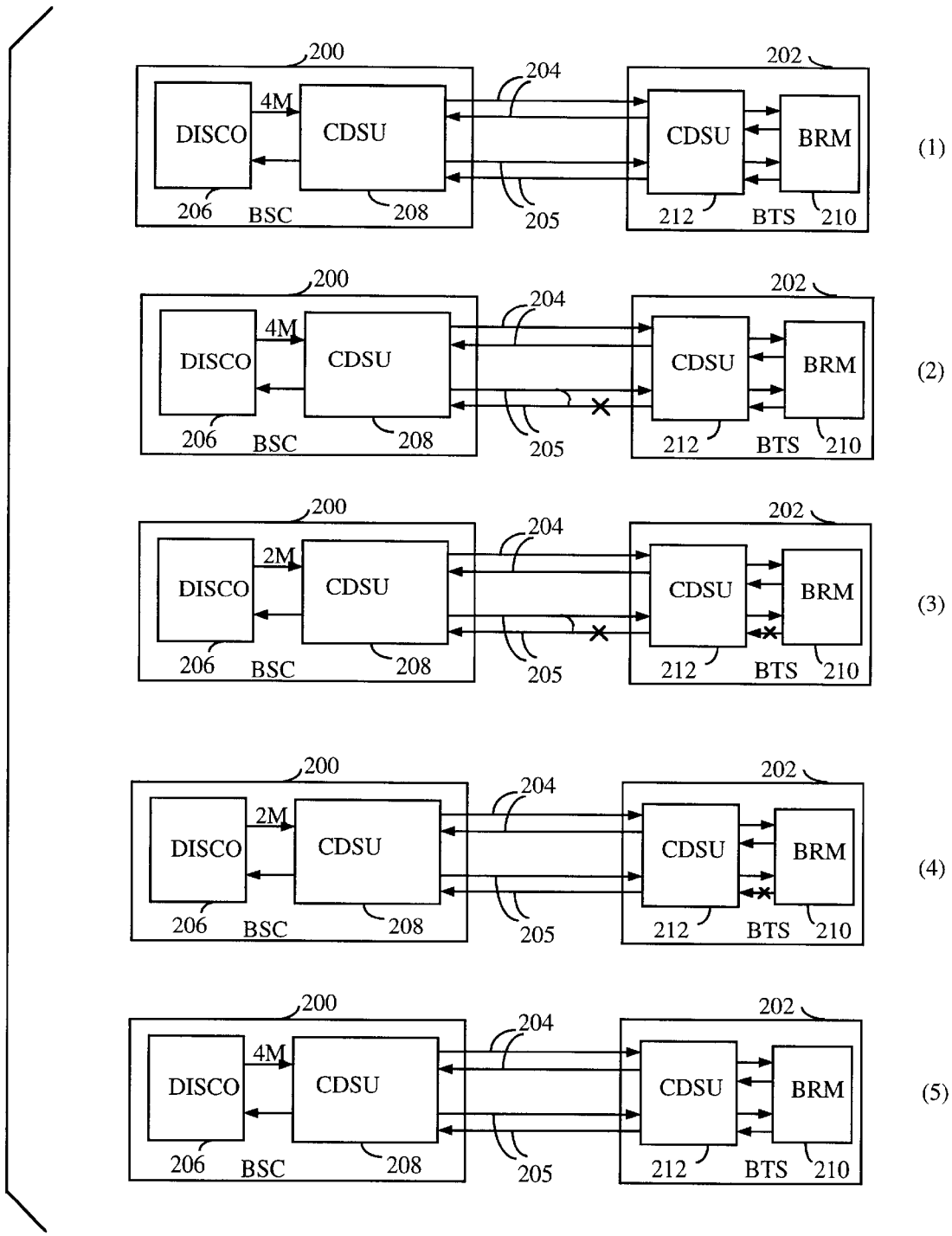
FIG. 13 is a block diagram of the backhaul connection of FIG. 8, illustrating five states of activity when the BSC detects a loopback.

In one embodiment, in which frames are being looped back to the BSC 200, the BSC 200 detects the loopback and the system goes through the states of activity depicted in FIG. 13. In state (1), before the loopup has occurred, operations are normal. Data is transferred from the DISCO 206 to the CDSU 208 at a given rate, advantageously four megabits per second (Mbps). In state (2), after a loopup has occurred, some frames of data are being lost. The CDSU 208 within the BSC 200 detects that the frames the CDSU 208 is sending on E1/T1 link 205 are being looped back to the CDSU 208.

In state (3), after the loopup is detected, it is tolerated. The CDSU 208 stops using the port connected to the link 205 in loopback, and sends a predetermined sequence of bits (a BSC loopback detect sequence, or BSCLDS) onto the link 205 in loopback. The CDSU 208 adjusts its data terminal equipment (not shown) to accept data frames from the DISCO 206 at half the prior data rate, e.g., at two Mbps, to compensate for the fact that half of the available E1/T1 lines 204, 205 are not being used. The proportional rate adjustment varies with the total number of E1/T1 lines 204, 205 and the number of lines 204, 205 in loopback.

Still in state (3), the CDSU 212 within the BTS detects the BSCLDS being received on the port connected to the link 205 in loopback. The CDSU 212 consequently signals the BRM 210 by, e.g., turning off a green LED associated with the particular link 205 in loopback. This signal causes the HFD hardware (not shown) within the BRM 210 to stop putting frames onto the port connected to the link 205 in loopback. Although the CDSU 208 stops putting data frames on the link 205, sync flags are still advantageously sent. Advantageously, BRM 210 software may poll a status register (not shown) within the CDSU 208 to determine whether a BSCLDS receive bit is set, in which case the BRM 210 notifies the BSM about the loopup.

In state (4), after loopdown (i.e., after the loopback is gone), the CDSU 208 in the BSC 200 stops detecting the BSCLDS returning on the receive port for the link 205. The CDSU 208 stops sending the BSCLDS onto the link 205 and instead begins sending sync flags and then real data frames onto the link 205.

In state (5), after loopdown, the BSC 200 is cleared. The CDSU 212 in the BTS 202 stops detecting the BSCLDS on the link 205, and a few seconds later, signals the BRM 210 by, e.g., enabling the green LED associated with the link 205. When the HFD hardware in the BRM 210 detects the enabled LED, the HFD hardware begins putting real data frames onto the link 205 again. The BRM 210 may advantageously report the loopdown to the BSM. The CDSU 208 in the BSC 200 readjusts its data terminal equipment to accept data frames from the DISCO 206 at the normal data rate, advantageously four Mbps. A controller (not shown) in the DISCO 206 may advantageously poll the CDSU 208 to determine that loopdown has occurred and notify the BSM.

Figure 14:
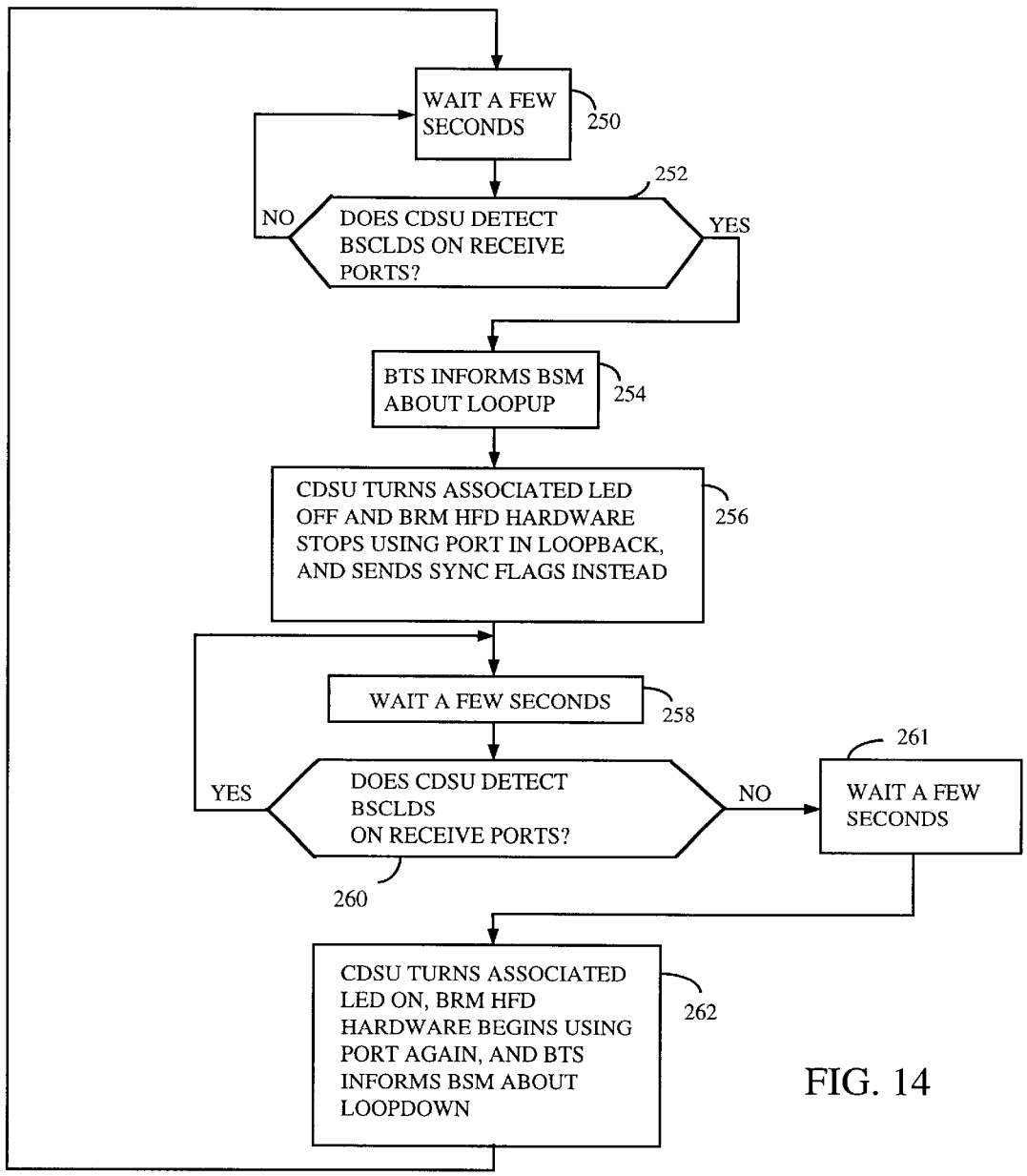
FIG. 14 is a flowchart of BTS steps in an algorithm for processing a loopback detected by a BSC.

In one embodiment the BTS engages in the steps shown in FIG. 14 when the BSC is facing a loop. In step 250 the BTS waits a few seconds, e.g., two seconds, before proceeding to step 252. In an alternate embodiment the step 250 of waiting a few seconds could be replaced by a step of using an interrupt-driven mechanism, which could decrease loopback detection times. In step 252 the CDSU in the BTS checks whether the BSCLDS is being received at any of the receive ports. If the BSCLDS is not being received, the BTS returns to step 250. If, on the other hand, the BSCLDS is being received in step 252, the BTS proceeds to step 254. In step 254 the BTS informs the BSM about the loopup. The BTS then proceeds to step 256. In step 256 the CDSU in the BTS turns off an LED associated with the port at which the BSCLDS is being received, and the HFD hardware in the BRM stops using that port for real data and sends sync flags instead. In an alternate embodiment, steps 254 and 256 are performed in reverse order. The BTS then proceeds to step 258, waiting a few seconds, e.g., two seconds, before proceeding to step 260. In step 260 the CDSU in the BTS again checks whether the BSCLDS is being received. If the BSCLDS is still being received, the BTS returns to step 258. If, on the other hand, the BSCLDS is not being received in step 260, the BTS proceeds to step 261, waiting a few seconds. In step 261 the BTS waits a few seconds, e.g., two seconds, before proceeding to step 262. In step 262 the CDSU in the BTS enables the LED associated with the port connected to the link that is now no longer in loopback, the HFD hardware in the BRM starts using that port again for real data, and the BTS informs the BSM about the loopdown. The BTS then returns to step 250.

Figure 15:
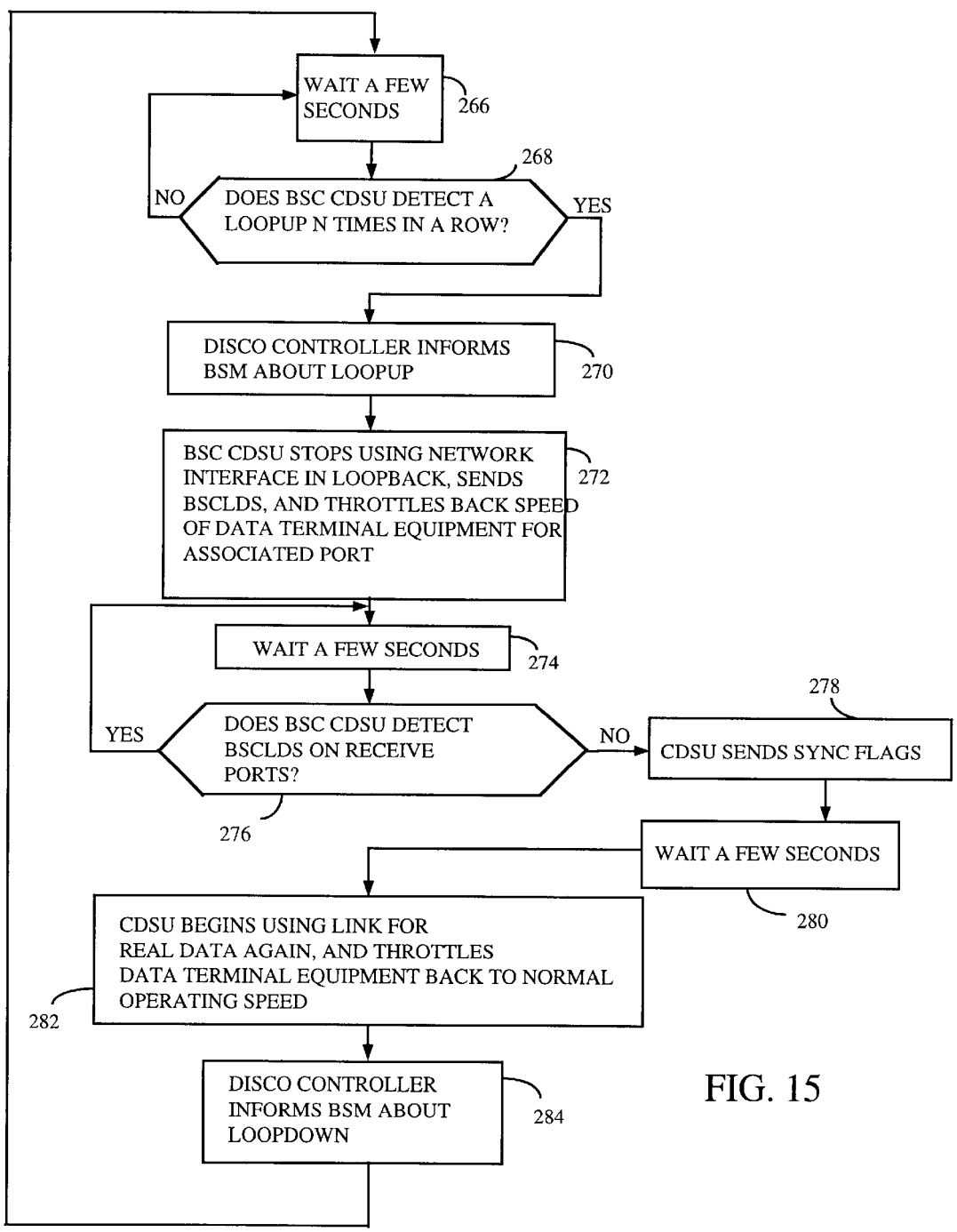
FIG. 15 is a flowchart of BSC steps in an algorithm for processing a loopback detected by a BSC.

In one embodiment the BSC engages in the steps shown in FIG. 15 when facing a loop. In step 266 the BSC waits a few seconds, e.g., two seconds, before proceeding to step 268. In an alternate embodiment the step 266 of waiting a few seconds could be replaced by a step of using an interrupt-driven mechanism, which could decrease loopback detection times. In step 268, if the CDSU in the BSC detects a loopup (i.e., specific frames returning to the BSC on the same link within a predefined time interval) a predefined number of times in a row, the BSC proceeds to step 270. If, on the other hand, the CDSU in the BSC does not detect a loopup a predefined number of times in a row in step 268, the BSC returns to step 266. In one embodiment the predefined number of times N is three times. In step 270 the DISCO controller in the BSC informs the BSM about the loopup. The BSC then proceeds to step 272. In step 272 the CDSU in the BSC stops using the network interface in loopback for real data frames, sends the BSCLDS on the link that is in loopback, and throttles back the data terminal equipment speed in order to receive data at a lower rate from the DISCO. The BSC then proceeds to step 274, waiting a few seconds, e.g., two seconds, before proceeding to step 276. In step 276 the CDSU in the BSC checks whether the BSCLDS is being received. If the BSCLDS is being received, the BSC returns to step 274. If, on the other hand, the BSCLDS is not being received in step 276, the BSC proceeds to step 278. In step 278 the CDSU sends sync flags on the link that was in loopback. The BSC then proceeds to step 280, waiting a few seconds, e.g., two seconds, before proceeding to step 282. In step 282 the CDSU begins using the link for real data again, and throttles the data terminal equipment back to normal operating speed. Again, it should be noted that the transmit and receive speeds may advantageously be throttled back to normal operating speed asymmetrically. Thus, the receive speed may be throttled back to normal operating speed a few seconds before the transmit speed is throttled back to normal operating speed. The BSC then proceeds to step 284. In step 284 the DISCO controller informs the BSM about the loopdown. The BSC then returns to step 266.

In the embodiments described herein, the BTSLDS and the BSCLDS are advantageously different bit sequences. This allows double loopbacks to be detected.

In the embodiments herein described, the loopback algorithm is applied to the communications interfaces between a BSC and a BTS in a cellular telephone system. Those of skill in the art would understand that the loopback algorithm might also be applied to the communications interfaces between a pair of BSCs in a cellular telephone system. Indeed, those of skill in the art would understand that the loopback algorithm as herein described lends itself equally well to any interface connecting point-to-point entities in a wide-area network such that high-speed data frames must be multiplexed onto several lower-speed interface connections for transmission between the entities.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method of processing loopbacks in communications interfaces between first and second entities in a network, the method comprising:

detecting, at the first entity, a loopback in a communications interface including detecting a data frame arriving at the first entity on the communications interface within a predefined time interval after the data frame has been sent from the first entity on the communications interface; and sending, from the first entity, a loopback detect sequence on the communications interface until the loopback detect sequence does not return to the first entity on the communications interface.

2. The method of claim 1, further comprising the step of receiving the loopback detect sequence at the second entity on the communications interface.

3. The method of claim 1, further comprising the step of routing real data to the communications interface after performing the stopping step and away from the communications interface after initiating the sending step.

4. The method of claim 1, further comprising the step of routing real data away from the communications interface after initiating the sending step.

5. The method of claim 1, further comprising the step of informing a network operator that the communications interface is in loopback.

6. The method of claim 1, further comprising the step of informing a network operator that the communications interface is no longer in loopback.

7. The method of claim 1, wherein the first entity is a base station transceiver subsystem, the second entity is a base station controller, and the wide area network is a cellular telecommunications system.

8. The method of claim 1, wherein the first entity is a base station controller, the second entity is a base station transceiver subsystem, and the wide area network is a cellular telecommunications system.

9. The method of claim 1, wherein the loopback detect sequence is a predefined sequence of bits.

10. The method of claim 1, further comprising the step of recording the time elapsed between when the data frame was sent from the first entity and when the data frame returned to the first entity.

11. The method of claim 2, further comprising the step of routing real data away from the communications interface after initiating the receiving step.

12. The method of claim 2, further comprising the step of routing real data to the communications interface if the receiving step has stopped being performed.

13. A device for processing loopbacks in communications interfaces between first and second entities in a network, the device comprising:

means for detecting a loopback in a communications interface, wherein the means for detecting comprises means for detecting a data frame arriving at the first entity on the communications interface within a predefined time interval after the data frame has been sent from the first entity on the communications interface; and means for sending a loopback detect sequence on the communications interface until the loopback detect sequence does not return to the first entity on the communications interface.

14. The device of claim 11, further comprising means for receiving the loopback detect sequence on the communications interface, the means for receiving being coupled to the second entity.

15. The device of claim 13, further comprising means for routing real data to the communications interface.

16. The device of claim 13, further comprising means for routing real data away from the communications interface.

17. The device of claim 13, further comprising means for informing a network operator that the communications interface is in loopback.

18. The device of claim 13, further comprising means for informing a network operator that the communications interface is no longer in loopback.

19. The device of claim 13, wherein the first entity is a base station transceiver subsystem, the second entity is a base station controller, and the wide area network is a cellular telecommunications system.

20. The device of claim 13, wherein the first entity is a base station controller, the second entity is a base station transceiver subsystem, and the wide area network is a cellular telecommunications system.

21. The device of claim 13, wherein the loopback detect sequence comprises a predefined sequence of bits.

22. The device of claim 13, further comprising means for recording the time elapsed between when the data frame was sent from the first entity and when the data frame returned to the first entity.

23. A device for processing loopbacks in communications interfaces between first and second entities in a network, the device comprising:

first circuitry to detect a loopback in a communications interface, wherein the first circuitry comprises circuitry to detect a data frame arriving at the first entity on the communications interface within a predefined time interval after the data frame has been sent from the first entity on the communications interface; and second circuitry to send a loopback detect sequence on the communications interface until the loopback detect sequence does not return to the first entity on the communications interface.

24. The device of claim 23, further comprising fourth circuitry for receiving the loopback detect sequence on the communications interface, the fourth circuitry being coupled to the second entity.

25. The device of claim 23, further comprising fourth circuitry for routing real data to the communications interface.

26. The device of claim 23, further comprising fourth circuitry for routing real data away from the communications interface.

27. The device of claim 23, further comprising fourth circuitry for informing a network operator that the communications interface is in loopback.

28. The device of claim 23, further comprising fourth circuitry for informing a network operator that the communications interface is no longer in loopback.

29. The device of claim 23, wherein the first entity is a base station transceiver subsystem, the second entity is a base station controller, and the wide area network is a cellular telecommunications system.

30. The device of claim 23 wherein, the first entity is a base station controller, the second entity is a base station transceiver subsystem, and the wide area network is a cellular telecommunications system.

31. The device of claim 23, wherein the loopback detect sequence comprises a predefined sequence of bits.

32. The device of claim 23, further comprising fourth circuitry for recording the time elapsed between when a data frame was sent from the first entity and when the data frame returned to the first entity.

* * * * *